(12) United States Patent
Trawick et al.

(10) Patent No.: US 12,368,359 B2
(45) Date of Patent: Jul. 22, 2025

(54) ELECTRICAL ENERGY SYSTEM HAVING ACTIVE SEGMENTS FOR VARIABLE VOLTAGE GENERATION

(71) Applicant: Rolls-Royce Corporation, Indianapolis, IN (US)

(72) Inventors: David Russell Trawick, Indianapolis, IN (US); Mathew Gregory Hill, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/314,453

(22) Filed: May 9, 2023

(65) Prior Publication Data

US 2024/0380295 A1    Nov. 14, 2024

(51) Int. Cl.
| | |
|---|---|
| *H02K 21/16* | (2006.01) |
| *H02K 1/2789* | (2022.01) |
| *H02K 7/12* | (2006.01) |
| *H02K 7/18* | (2006.01) |
| *H02K 7/20* | (2006.01) |

(52) U.S. Cl.
CPC .......... *H02K 21/16* (2013.01); *H02K 1/2789* (2022.01); *H02K 7/12* (2013.01); *H02K 7/1823* (2013.01); *H02K 7/20* (2013.01)

(58) Field of Classification Search
CPC ........ H02K 21/16; H02K 1/2789; H02K 7/12; H02K 7/1823; H02K 7/20; H02K 2213/09; H02K 21/029; F05D 2220/768; F02C 7/275; F02C 7/32; F01D 15/10
See application file for complete search history.

(56) References Cited

U.S. PATENT DOCUMENTS

| | | |
|---|---|---|
| 2002/0117927 A1 | 8/2002 | Kim et al. |
| 2004/0041485 A1 | 3/2004 | Horber |
| 2008/0036322 A1* | 2/2008 | Franke ................... H02K 16/02 310/114 |

(Continued)

OTHER PUBLICATIONS

Extended Search Report from counterpart European Application No. 23212736.5 dated May 24, 2024, 12 pp.

(Continued)

*Primary Examiner* — Tulsidas C Patel
*Assistant Examiner* — Joshua Kiel M Rodriguez
(74) *Attorney, Agent, or Firm* — Shumaker & Sieffert, P.A.

(57) ABSTRACT

An example electrical machine is described that includes active segments for variable voltage generation. The electrical machine includes a drive shaft, a fixed rotor segment, an active rotor segment, and an actuator mechanism. The fixed rotor segment is coupled to the drive shaft, where the fixed rotor segment has affixed thereon first permanent magnets of alternating polarity. The active rotor segment axially is adjacent to the fixed rotor segment along the drive shaft. The active rotor segment also has affixed thereon second permanent magnets of alternating polarity. The actuator mechanism is configured to articulate the active rotor segment relative to the fixed rotor segment and thereby alter a phase of the second permanent magnets relative to the first permanent magnets in order to change a first voltage generated by the electrical machine to a second voltage generated by the electrical machine.

17 Claims, 10 Drawing Sheets

(56) References Cited

U.S. PATENT DOCUMENTS

2018/0367017 A1* 12/2018 Turvey ................ H02K 1/2753

OTHER PUBLICATIONS

Yang et al., "Flux Adjustable Permanent Magnet Machines: A Technology Status Review", Chinese Journal of Electrical Engineering, vol. 2, No. 2, Dec. 2016, 17 pp.

Response to Extended Search Report dated May 24, 2024, from counterpart European Application No. 23212736.5 filed Apr. 3, 2025, 73 pp.

* cited by examiner

ELECTRICAL ENERGY SYSTEM HAVING ACTIVE SEGMENTS FOR VARIABLE VOLTAGE GENERATION

TECHNICAL FIELD

The present disclosure relates to electrical energy systems that involve an electrical machine, such as a permanent magnet generator.

BACKGROUND

Electric machines covert between electrical energy and mechanical energy. As one example, an electric machine may operate as a generator that converts mechanical energy into electrical energy. As another example, an electric machine may operate as an electrical motor that converts electrical energy into mechanical energy. Electric machines typically include a rotor that rotates within a stator. Energy flows through the stator to or from the rotor. In an electric motor, the stator provides a rotating magnetic field that drives the rotor. In a generator, the stator converts the rotating magnetic field to electric energy.

SUMMARY

In general, various aspects of the techniques described in this disclosure may enable an electrical machine, such as a starter motor and/or generator, having an active rotor segment that facilitates more consistent voltage generation within defined ranges. The electrical machine (which may refer to a starter motor/generator, a starter motor, and/or a generator) may include second permanent magnets affixed to the active rotor segment in alternative polarities as well as first permanent magnets affixed to a fixed rotor segment in alternative polarities. Via an actuator mechanism, the electrical machine may displace (e.g., rotate) the active motor segment relative to the fixed rotor segment, which may alter the phase of the second permanent magnets relative to the first permanent magnets in order to change a first voltage generated by the generator to a second different voltage.

By displacing the active rotor segment relative to the fixed rotor segment, the electrical machine may reduce or increase induction by the first and second permanent magnets during operation of the generator. For example, displacing the active rotor segment such that the alternating polarities of the first and second permanent magnets more closely align (meaning a north/south polarity of the first permanent magnets are more closely adjacent to a north/south polarity of the second permanent magnets) may result in increased induction and therefore higher voltage generation. Likewise, displacing the active rotor segment such that the alternating polarities of the first and second permanent magnets are more closely unaligned (meaning a north/south polarity of the first permanent magnets are more closely adjacent to a south/north polarity of the second permanent magnets) may result in decreased induction and less voltage generation.

The actuation mechanism may displace the active rotor segment in a manner that allows for more consistent voltage generation. In permanent magnet generators in which no active rotor segments are employed, voltage is generated as a function of revolutions per minute for the rotor within the generator, providing more voltage when the rotor rotates faster. Higher voltages may produce more heat, which in certain contexts may require the addition of a cooling system, which adds weight and additional maintenance to the electrical system. Further, when the generator fails (e.g., short circuits) or there is an issue with an electrical system powered by the generator, there needs to be a mechanism (e.g., a clutch) to disengage the generator from the driving torque (e.g., a spool of a gas turbine engine), which further complicates the electrical system, adding weight and additional maintenance. The addition of the active rotor segments within the generator may, via the actuator mechanism, allow the generator to more consistently generate voltages within a range, as well as disable voltage generation to accommodate failures or other issues in the electrical system.

In this respect, various aspects of the techniques may provide one or more technical improvements that realize one or more practical applications. Permanent magnet generators may provide many benefits given that permanent magnets may involve high magnetic field production that are capable of generating high voltages in relatively small generators (e.g., small in terms of size and weight). Such permanent magnet generators may better suit contexts (e.g., Aerospace) where size and weight are critical concerns. However, the use of permanent magnet generators in contexts (e.g., avionics) in which additional cooling systems and/or clutches are required to mitigate safety issues that arise due to failures may reduce the applicability of permanent magnet generators in these contexts where size and weight are critical concerns. Use of the active rotor segments that allow the permanent magnet generators to control, via the actuator mechanism, the voltage generation may allow permanent magnet generators to be used in electrical systems without the need for cooling systems and/or clutches, thereby providing the benefits of permanent magnet generators in terms of size and weight without requiring the safety issue mitigation systems, such as the cooling systems and/or clutches.

In one example, various aspects of the techniques are directed to an electrical machine comprising: a drive shaft; a fixed rotor segment coupled to the drive shaft, the fixed rotor segment having affixed thereon first permanent magnets of alternating polarity; an active rotor segment axially adjacent to the fixed rotor segment along the drive shaft, the active rotor segment having affixed thereon second permanent magnets of alternating polarity; and an actuator mechanism configured to articulate the active rotor segment relative to the fixed rotor segment and thereby alter a phase of the second permanent magnets relative to the first permanent magnets in order to change a first voltage generated by the electrical machine to a second voltage generated by the electrical machine.

In another example, various aspects of the techniques are directed to a method comprising: generating, by an electrical machine comprising a fixed rotor segment axially adjacent to an active rotor segment along a drive shaft, a first voltage; and displacing the active rotor segment relative to the fixed rotor segment of the electrical machine in order to alter a phase of second permanent magnets affixed to the active rotor segment relative to first permanent magnets affixed to the fixed rotor segment so as to generate a second voltage.

In one example, various aspects of the techniques are directed to a A gas-turbine engine system comprising: a gas turbine engine that includes: a low pressure spool assembly configured to rotate a low pressure shaft; and a high pressure spool assembly mechanically coupled to the low pressure spool assembly; an electrical machine comprising; a drive shaft; a fixed rotor segment coupled to the drive shaft, the fixed rotor segment having affixed thereon first permanent magnets of alternating polarity; an active rotor segment axially adjacent to the fixed rotor segment along the drive shaft, the active rotor segment having affixed thereon second permanent magnets of alternating polarity; and an actuator mechanism configured to displace the active rotor segment relative to the fixed rotor segment and thereby alter a phase of the second permanent magnets relative to the first permanent magnets in order to change a first voltage generated by the electrical machine to a second voltage generated by the electrical machine; and an assembly gearbox configured to mechanically couple the low pressure shaft to the drive shaft.

The details of one or more examples are set forth in the accompanying drawings and the description below. Other features, objects, and advantages will be apparent from the description and drawings, and from the claims.

DETAILED DESCRIPTION

Figure 1:
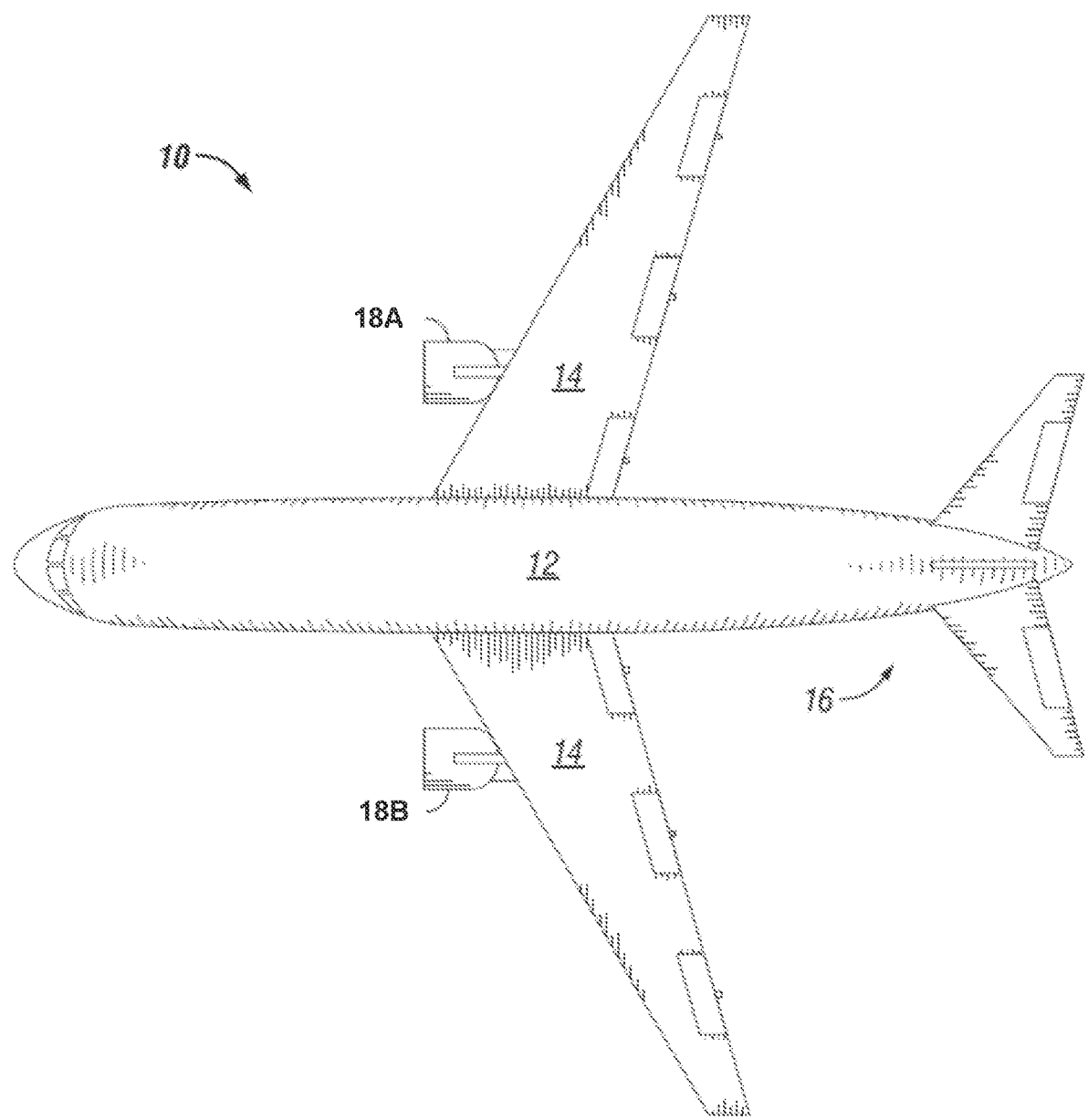
FIG. 1 is a conceptual diagram illustrating an example vehicle in accordance with an example of the present disclosure.

The present disclosure is directed to electrical machines, such as a permanent magnet electrical machine. In some instances, the permanent magnet electrical machine may be used in combination with a gas turbine engine used in vehicles, such as an aircraft. For ease of description, examples of the disclosure will be primarily described in the context of aircraft as a gas-turbine engine powered vehicle. However, examples of the disclosure are not limited to aircraft. For instance, aspects of this disclosure may be applicable to gas-turbine powered ground vehicles, watercraft, and the like.

Aircraft increasingly require significant amounts of additional electrical power. For instance, in bleedless aircraft, various systems traditionally operated using bleed air (e.g., de-icing, cabin pressurization, engine start) may be replaced with electrically operated versions. Those electrical systems may increase the electrical load requirements for the vehicle.

Electrical machines that function as electric generators may be employed by gas-turbine combustion engine power aircraft to satisfy the transient and/or continuous electrical loads associated with the electrical system(s). For example, a gas-turbine engine having a low-pressure spool assembly (e.g., including a low-pressure (LP) compressor and/or propulsor and a low-pressure turbine connected by a low-pressure shaft) and high-pressure (HP) spool assembly (e.g., including a HP pressure compressor and a HP turbine connected by a HP shaft) may include an electric generator that generates electricity from the rotation of the LP spool shaft and/or the HP spool shaft. The electrical power extracted from the LP spool shaft and/or the HP spool shaft may be used to supply power to various aircraft systems (e.g., electrical systems of the vehicle system that require electrical energy to operate, such as aircraft anti-ice heating, weapon systems, navigation systems including radar, environmental cooling systems (ECS), gas-turbine engine control systems, gas-turbine ignition systems, etc.).

Examples of the gas-turbine engine systems may include a high-pressure (HP) spool assembly and at least one other lower pressure (LP) spool assembly (e.g., a low-pressure spool assembly and/or an intermediate pressure spool assembly). The gas-turbine engine may include a generator coupled to the LP shaft of the LP spool assembly so that the generator generates power from the rotation of the LP shaft.

One type of generator suitable for aircraft is referred to as a permanent magnet generator. A permanent magnet generator includes a rotor having affixed thereon permanent magnets, which are commonly formed from rare earth metals that produce large magnetic fields relative to the size of the permanent magnets. These high magnetic fields may induce a large current in windings around stators of the permanent magnetic generator, and thereby generate high voltages. As such, permanent magnet generators are relatively small and light, but may produce high voltages similar to much larger and heavier generators, such as induction generators. Given the size and weight, permanent magnet generators may reduce flight weight of the aircraft while providing sufficient power to the electrical systems.

However, for permanent magnet generators, voltage is generated as a function of revolutions per minute for the rotor, providing more voltage when the rotor rotates faster. Higher voltages may produce more heat, which in certain contexts may require the addition of a cooling system, which adds weight and additional maintenance to the electrical system. Further, when the generator fails (e.g., short circuits) or there is an issue with an electrical system powered by the generator, there needs to be a mechanism (e.g., a clutch) to disengage the generator from the driving torque (e.g., a spool of a gas turbine engine), which adds additional complexities the electrical system in terms of adding weight and additional maintenance.

In accordance with various aspects of the techniques described in this disclosure, a permanent magnet generator may include an active rotor segment that facilitates more consistent voltage generation within defined ranges. This generator (which may refer to a starter motor/generator, a starter motor, and/or a generator) may include second permanent magnets affixed to the active rotor segment in alternative polarities as well as first permanent magnets affixed to a fixed rotor segment in alternative polarities. Via an actuator mechanism, the generator may displace (e.g., rotate) the active motor segment relative to the fixed rotor segment, which may alter the phase of the second permanent magnets relative to the first permanent magnets in order to change a first voltage generated by the generator to a second different voltage.

By displacing the active rotor segment relative to the fixed rotor segment, the generator may reduce or increase induction by the first and second permanent magnets during operation of the generator. For example, displacing the active rotor segment such that the alternating polarities of the first and second permanent magnets more closely align (meaning a north/south polarity of the first permanent magnets are more closely adjacent to a north/south polarity of the second permanent magnets) may result in increased induction and therefore higher voltage generation. Likewise, displacing the active rotor segment such that the alternating polarities of the first and second permanent magnets are more closely unaligned (meaning a north/south polarity of the first permanent magnets are more closely adjacent to a south/north polarity of the second permanent magnets) may result in decreased induction and less voltage generation.

In this respect, various aspects of the techniques may provide one or more technical improvements that realize one or more practical applications. The actuation mechanism may displace the active rotor segment in a manner that allows for more consistent voltage generation. The addition of the active rotor segments within the generator may, via the actuator mechanism, allow the generator to more consistently generate voltages within a range, as well as disable voltage generation to accommodate failures or other issues in the electrical system without requiring additional cooling systems and/or a clutch to disengage the generator from a prime mover, e.g., the LP spool, the HP spool, etc. As such, the generator having active rotor segments may provide the benefits of permanent magnet generators without introducing high voltages that may require larger and more tolerant safety measures in terms of fuses, switches, and other electrical components, as well as avoiding the need for cooling systems to counteract the increased heat and/or a clutch to disengage the generator from the driving torque in failure events.

FIG. 1 is a conceptual diagram illustrating an example vehicle in accordance with an example of the present disclosure. In the example of FIG. 1, the vehicle includes an aircraft 10. In other examples, the vehicle may include any type of gas-turbine engine-powered vehicle, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. The vehicle may be manned, semiautonomous, or autonomous. Furthermore, while described with respect to gas-turbine engine-powered vehicles, different types of engines may be used along with the generator described in this disclosure, such as steam turbines, piston engines, sterling engines, and the like.

In any event, aircraft 10 includes a fuselage 12, wings 14, an empennage 16, two gas-turbine engine systems 18A and 18B (collectively, "gas-turbine engines 18") as main propulsion engines. In other examples, aircraft 10 may include a single gas-turbine engine 18 or more than two propulsion systems 18. As illustrated in FIG. 1, aircraft 10 is a twin-engine turbofan aircraft. In some examples, aircraft 10 may be any fixed-wing aircraft, including turbofan aircraft, turbojet aircraft, and turboprop aircraft. In some examples, aircraft 10 may be a rotary-wing aircraft or a combination rotary-wing/fixed-wing aircraft (e.g., vertical takeoff and landing—VTOL, short takeoff and landing—STOL, etc.). Aircraft 10 may employ any number of wings 14. Empennage 16 may employ a single or multiple flight control surfaces. Gas-turbine engines 18 may be the main propulsion systems of aircraft 10. Aircraft 10 may also have more than two engines such as three or four engines or may have a single engine.

Aircrafts, such as aircraft 10 may increasingly require significant amounts of additional electrical power. For instance, in bleedless aircraft, various systems traditionally operated using bleed air (e.g., de-icing, cabin pressurization, engine start) may be replaced with electrically operated versions. Those electrical systems may increase the electrical load requirements for aircraft 10.

Electrical machines that function as electric generators may be employed by gas-turbine combustion engine power aircraft, such as aircraft 10, to satisfy the transient and/or continuous electrical loads associated with the electrical system(s). For example, a gas-turbine engine having a low-pressure spool assembly (e.g., including a low-pressure (LP) compressor and/or propulsor and a low-pressure turbine connected by a low-pressure shaft) and high-pressure (HP) spool assembly (e.g., including a HP pressure compressor and a HP turbine connected by a HP shaft) may include an electric generator that generates electricity from the rotation of the LP spool shaft and/or the HP spool shaft. The electrical power extracted from the LP spool shaft and/or the HP spool shaft may be used to supply power to various aircraft systems (e.g., electrical systems of the vehicle system that require electrical energy to operate, such as aircraft anti-ice heating, weapon systems, navigation systems including radar, environmental cooling systems (ECS), gas-turbine engine control systems, gas-turbine ignition systems, etc.).

Examples of the gas-turbine engine systems may include a high-pressure (HP) spool assembly and at least one other lower pressure (LP) spool assembly (e.g., a low-pressure spool assembly and/or an intermediate pressure spool assembly). The gas-turbine engine may include a generator coupled to the LP shaft of the LP spool assembly so that the generator generates power from the rotation of the LP shaft, the HP shaft of the HP spool assembly, or any other prime mover of an engine or other machine.

One type of generator suitable for aircraft is referred to as a permanent magnet generator. A permanent magnet generator includes a rotor having affixed thereon permanent magnets, which are commonly formed from rare earth metals that produce large magnetic fields relative to the size of the permanent magnets. These high magnetic fields may induce a large current in windings around stators of the permanent magnetic generator, and thereby generate high voltages. As such, permanent magnet generators are relatively small and light, but may produce high voltages similar to much larger and heavier generators, such as induction generators. Given the size and weight, permanent magnet generators may reduce flight weight of aircraft 10 while providing sufficient power to the electrical systems.

However, for permanent magnet generators, voltage is generated as a function of revolutions per minute for the rotor, providing more voltage when the rotor rotates faster. Higher voltages may produce more heat, which in certain contexts may require the addition of a cooling system, which adds weight and additional maintenance to the electrical system. Further, when the generator fails (e.g., short circuits) or there is an issue with an electrical system powered by the generator, there needs to be a mechanism (e.g., a clutch) to disengage the generator from the driving torque (e.g., a spool of a gas turbine engine), which adds additional complexities the electrical system in terms of adding weight and additional maintenance.

In accordance with various aspects of the techniques described in this disclosure, a permanent magnet generator may include an active rotor segment that facilitates more consistent voltage generation within defined ranges. This generator (which may refer to a starter motor/generator, a starter motor, and/or a generator—or any other electrical machine) may include second permanent magnets affixed to the active rotor segment in alternative polarities as well as first permanent magnets affixed to a fixed rotor segment in alternative polarities. Via an actuator mechanism, the generator may displace (e.g., rotate) the active motor segment relative to the fixed rotor segment, which may alter the phase of the second permanent magnets relative to the first permanent magnets in order to change a first voltage generated by the generator to a second different voltage.

While described with respect to active rotor segments, the generator may include active stator segments configured to be displaced relative to fixed stator segments in addition to or as an alternative to active rotor segments that are configured to be displaced relative to fixed rotor segments. Generally, the generator may include active segments (active rotor and/or stator segments) and fixed segments (fixed rotor and/or stator segments) that facilitate cancellation of magnetic flux to reduce or otherwise alter voltage generation. Although described herein with respect to active rotor segments, various aspects of the techniques described in this disclosure may enable such active segments and fixed segments in a manner that reduces or increases induction via magnet flux in permanent magnet generators.

By displacing the active rotor segment relative to the fixed rotor segment, the generator may reduce or increase induction by the first and second permanent magnets during operation of the generator. For example, displacing the active rotor segment such that the alternating polarities of the first and second permanent magnets more closely align (meaning a north/south polarity of the first permanent magnets are more closely adjacent to a north/south polarity of the second permanent magnets) may result in increased induction and therefore higher voltage generation. Likewise, displacing the active rotor segment such that the alternating polarities of the first and second permanent magnets are more closely unaligned (meaning a north/south polarity of the first permanent magnets are more closely adjacent to a south/north polarity of the second permanent magnets) may result in decreased induction and less voltage generation.

In this respect, various aspects of the techniques may provide one or more technical improvements that realize one or more practical applications. The actuation mechanism may displace the active rotor segment in a manner that allows for more consistent voltage generation. The addition of the active rotor segments within the generator may, via the actuator mechanism, allow the generator to more consistently generate voltages within a range, as well as disable voltage generation to accommodate failures or other issues in the electrical system without requiring additional cooling systems and/or a clutch to disengage the generator from a prime mover, such as the LP spool, the HP spool, etc. As such, the generator having active rotor segments may provide the benefits of permanent magnet generators without introducing high voltages that may require larger and more tolerant safety measures in terms of fuses, switches, and other electrical components, as well as avoiding the need for cooling systems to counteract the increased heat and/or a clutch to disengage the generator from the driving torque in failure events.

While described with respect to aircraft 10, the techniques described in this disclosure may be performed with respect to any vehicle or equipment that requires electric power from a generator or that produces electric power using a generator. For example, a windmill may produce electric power using a generator, an electric vehicle may produce electric power (e.g., via regenerative breaking) using a generator, etc. As such, various aspects of the techniques described in this disclosure may be performed with respect any vehicle, equipment, and/or apparatus that includes or otherwise relies upon power generated by a generator. While referred to as a generator, the techniques described in this disclosure may be performed with respect to any electrical machine, such as a generator, a starter motor, an electric motor, a starter/generator, or any other form of electrical machine capable of either generating electricity through mechanical motion or consuming electricity to produce mechanical motion.

Figure 2A:
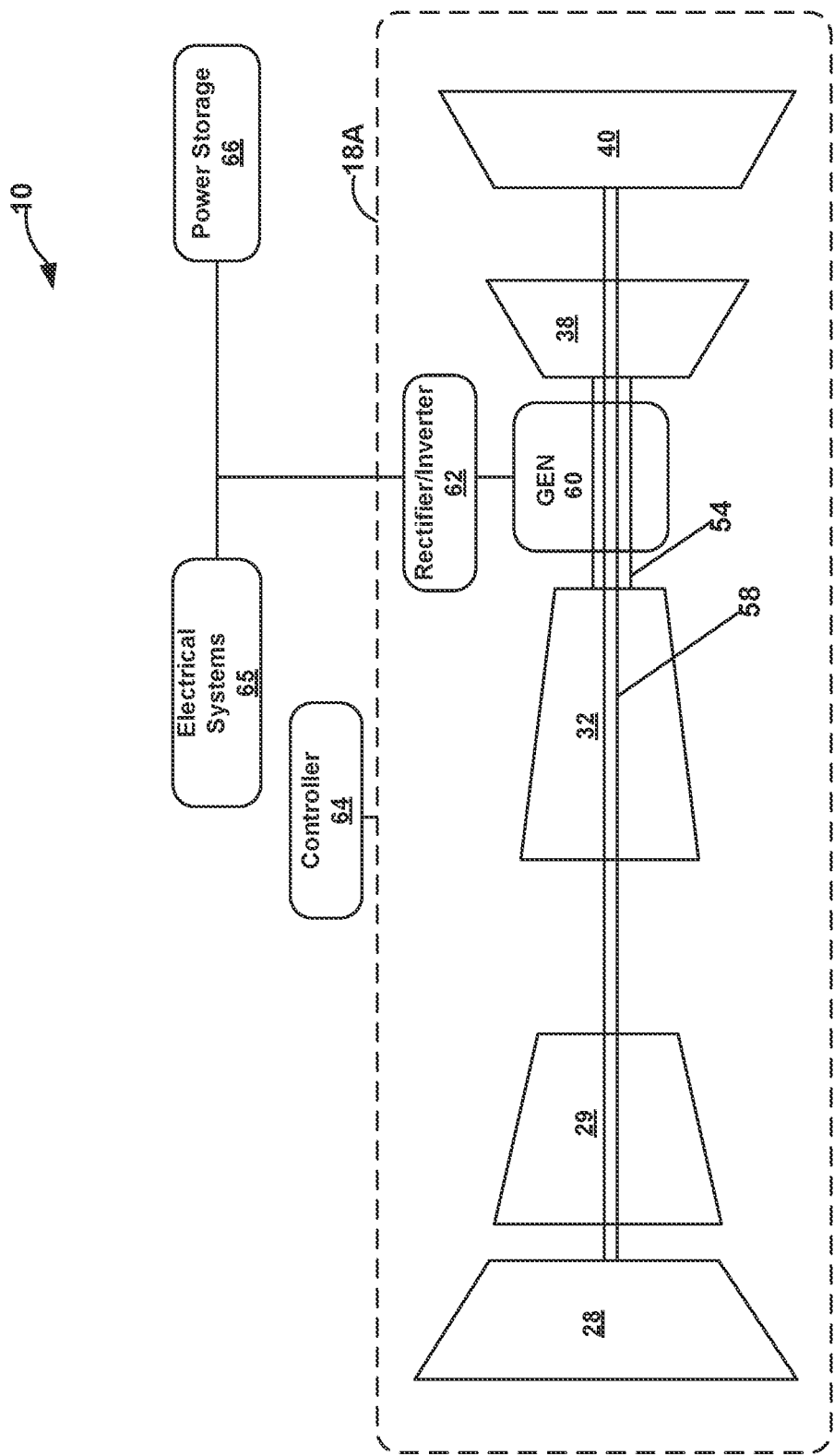
FIG. 2A is a conceptual diagram illustrating various examples of gas-turbine engine systems in accordance with examples of the present disclosure.

FIG. 2A is a conceptual and schematic diagram illustrating gas-turbine engine system 18A in accordance with an example of the present disclosure. Although described herein as with respect to an aircraft propulsion system, in other examples, gas-turbine engine 18A may be a propulsion system for providing propulsive thrust to any type of gas-turbine engine powered vehicle, as discussed above, or configured to provide power any suitable nonvehicle system including gas-turbine engine 18A. Engine 18B may be the same or similar to engine 18A in FIG. 1.

Engine 18A may be a primary propulsion engine that provides thrust for flight operations of aircraft 10. In the example of FIG. 2A, engine 18A is a two-spool engine having a high-pressure (HP) spool (rotor) 54 and a low-pressure spool (rotor) 58. In other embodiments, engine 18A may include three or more spools, e.g., may include an intermediate pressure (IP) spool and/or other spools and/or partial spools, e.g., on-axis or off-axis compressor and/or turbine stages (i.e., stages that rotate about an axis that is the same or different than that of the primary spool(s)). In one form, engine 18A is a turbofan engine. In other instances, engine 18A may be any other type of gas-turbine engine, such as a turboprop engine, a turboshaft engine, a propfan engine, a turbojet engine or a hybrid or combined cycle engine. As a turbofan engine, low-pressure spool 58 is operative to drive a propulsor 28 in the form of a fan, which may be referred to as a fan system. As a turboprop engine, low-pressure spool 58 powers a propulsor 28 in the form of a propeller system (not shown), e.g., via a reduction gearbox (not shown). In other embodiments, propulsor 28 may take other forms, such as one or more helicopter rotors or tilt-wing aircraft rotors, for example, powered by one or more engines 18A in the form of one or more turboshaft engines.

In some examples, engine 18A includes, in addition to propulsor 28, a bypass duct, a high-pressure (HP) compressor 32, a high-pressure (HP) turbine 38, a low-pressure turbine 40, which are generally disposed about and/or rotate about an engine centerline. In other embodiments, there may be, for example, an IP spool having an intermediate pressure turbine or other turbomachinery components, such as those mentioned above. In some examples, engine centerline is the axis of rotation of propulsor 28, HP compressor 32, HP turbine 38 and turbine 40. In other embodiments, one or more of propulsor 28, HP compressor 32, HP turbine 38 and turbine 40 may rotate about a different axis of rotation.

Propulsor 28 may include a fan rotor system driven by low-pressure spool 58. In various examples, the fan rotor system may include one or more rotors that are powered by turbine 40. In various embodiments, propulsor 28 may include one or more fan vane stages (not shown in FIG. 2A) that cooperate with fan blades (not shown) of the fan rotor system to compress air and to generate a thrust-producing flow. HP compressor 32 includes a compressor rotor system. In various examples, the compressor rotor system includes one or more rotors (not shown) that are powered by HP turbine 38. HP compressor 32 also includes a plurality of compressor vane stages (not shown in FIG. 2A) that cooperate with compressor blades (not shown) of the compressor rotor system to compress air. In various embodiments, the compressor vane stages may include a compressor discharge vane stage and/or one or more diffuser vane stages. In one form, the compressor vane stages are stationary. In other embodiments, one or more vane stages may be replaced with one or more counter-rotating blade stages.

HP turbine 38 includes a turbine rotor system. In various embodiments, the turbine rotor system includes one or more rotors having turbine blades (not shown) operative to extract power from the hot gases flowing through HP turbine 38 (not shown), to drive the compressor rotor system. HP turbine 38 also includes a plurality of turbine vane stages (not shown) that cooperate with the turbine blades of the turbine rotor system to extract power from the hot gases discharged by a combustor. In one form, the turbine vane stages are stationary. In other embodiments, one or more vane stages may be replaced with one or more counter-rotating blade stages.

The turbine rotor system is drivingly coupled to the compressor rotor system via a shafting system (also referred to as high-pressure (HP) shaft 54). Turbine 40 includes a turbine rotor system. In various embodiments, the turbine rotor system includes one or more rotors having turbine blades (not shown) operative to drive the fan rotor system. Turbine 40 may also include a plurality of turbine vane stages (not shown in FIG. 2A) that cooperate with the turbine blades of turbine rotor system 56 to extract power from the hot gases discharged by HP turbine 38. In one form, the turbine vane stages are stationary. In other embodiments, one or more vane stages may be replaced with one or more counter-rotating blade stages. The turbine rotor system is drivingly coupled to the fan rotor system via the shafting system (also referred to as low-pressure shaft 58).

In various examples, shafting systems 54 and 58 include a plurality of shafts that may rotate at the same or different speeds and directions for driving fan rotor system 48 rotor(s) and compressor rotor system 50 rotor(s). For ease of description, shafting system 54 of HP spool 24 is described primarily as HP shaft 54 but is it recognized that system 54 is not limited to a single shaft. Likewise, shafting system 58 of low-pressure spool 26 is described primarily as low-pressure shaft 58 but is it recognized that system 58 is not limited to a single shaft. Turbine 40 is operative to discharge the engine 18A core flow to nozzle 42A.

During normal operation of gas-turbine engine 18A, air is drawn into the inlet of propulsor 28 and pressurized. Some of the air pressurized by propulsor 28 is directed into HP compressor 32 as core flow. HP compressor 32 further pressurizes the portion of the air received therein from propulsor 28, which is then discharged into a diffuser. The diffuser reduces the velocity of the pressurized air, and directs the diffused core airflow into the combustor. Fuel is mixed with the pressurized air in the combustor, which is then combusted via an ignitor. The hot gases exiting the combustor are directed into turbines 38 and 40, which extract energy in the form of mechanical shaft power to drive HP compressor 32 and propulsor 28 via respective HP shaft 54 and low-pressure shaft 58. The hot gases exiting turbine 40 are discharged through a nozzle system, and provide a component of the thrust output by engine 18A.

As shown in FIG. 2A, engine 18A includes generator 60. Generator 60 may include any suitable type and/or arrangement of an electrical machine such as an electro-mechanical generator that operates in the manner described herein, e.g., by generating power from the rotation of low-pressure shaft 58, with the amount of power being generated being adjusted in some circumstances based on the operation of engine 18A. For example, the amount of power being generated by generator 60 may be increased in combination with a decrease in thrust by engine 18A, e.g., to temporarily increase the torque applied on low-pressure shaft 58 when the thrust generated by engine 18A is initially reduced.

In some examples, generator 60 may be positioned in front of the nose cone or spinner of engine 18A. In other examples, rather than being embedded and positioned coaxially with low-pressure shaft 58, generator 60 may be mounted on an externally mounted gearbox (e.g., an accessory gearbox) which is powered by a shaft driven from the LP rotor (or by either LP rotor or IP rotor in a three-spool engine).

In some examples, generator 60 may be an electrical machine that is configured to be selectively operated as an electric generator or an electric motor. Example of suitable motor-generators 60 may include one or more of the examples of the motor-generator and motor generator assemblies disclosed within U.S. patent application Ser. Nos. 15/590,623; 15/590,606; 15/590,581; and Ser. No. 15/590,554, filed May 9, 2017 and the example electrical machines describes in U.S. patent application Ser. No. 15/135,167 filed Dec. 19, 2013, where the entire content of these applications are incorporated by reference herein. In some examples, generator 60 may be selectively operated to extract and/or provide power to the low-pressure shaft 58. For example, generator 60 may be configured for selective operation between a generation mode to generate electrical power from rotation of the low-pressure turbine 40 and in a drive or motor mode to receive electrical power for applying rotational force to the low-pressure shaft 58. In some examples, generator 60 may be a permanent magnet alternator. However, in some examples of the disclosure, generator 60 is an electrical machine that operates in a generator mode but not a motor mode.

In the example of FIG. 2A as well as the other examples turbine engine systems described herein, generator 60 may be an embedded electrical machine in that the stator and rotor of electrical machine core are positioned coaxially with low-pressure shaft 58. The stator of generator 60 may be fixed against rotation relative to the low-pressure shaft 58 and a rotor may be coupled to the low-pressure shaft 58 for rotation therewith. The rotor may be attached to a mount of the low-pressure shaft 58 positioned axially between shaft bearings of the low-pressure shaft 58. The stator may include a number of stator windings positioned radially outward of the rotor, such that each stator winding is arranged in electromagnetic communication with the rotor. In other examples, generator 60 may include a stator and rotor positioned non-coaxially, e.g., where the rotor of generator 60 is rotationally coupled to low-pressure shaft 58 via one or more other shafts and suitable gearing.

As noted above, engine system 18A may be a gas turbofan system. Engine 18A may include propulsor rotor system 28 that is rotationally coupled to low-pressure turbine 40 by low-pressure shaft 58, and HP compressor 32 rotationally coupled to HP turbine 38 by HP shaft 54. The speed of HP shaft 54 driving the HP compressor 32 may be different from that of the speed of shaft 58 driving the propulsor rotor system 28. The combination of HP compressor 32, HP turbine 38 and HP shaft 54 may be referred to as the HP spool assembly 54 or HP spool 54.

Engine 18A of FIG. 2A includes low-pressure compressor 29. Low-pressure compressor 29 is coupled to rotationally coupled to low-pressure turbine 40 by low-pressure shaft 58. In some examples, low-pressure compressor 29 may be referred to as a booster. In some examples, low-pressure compressor 29 may be similar to that of HP compressor 32 and may include a compressor rotor system (not shown in detail in FIG. 2A). In various examples, the compressor rotor system includes one or more rotors (not shown) that are powered by low-pressure turbine 40. Low-pressure compressor 29 may also include a plurality of compressor vane stages (not shown in FIG. 2B) that cooperate with compressor blades (not shown) of the compressor rotor system to compress air. In various embodiments, the compressor vane stages may include a compressor discharge vane stage and/or one or more diffuser vane stages. In one form, the compressor vane stages are stationary. In other embodiments, one or more vane stages may be replaced with one or more counter-rotating blade stages. In operation, low-pressure compressor 29 may operate to increase the pressure of the intake air, which is then further increase in pressure by HP compressor 32.

The combination of propulsor system 28, low-pressure compressor 29, low-pressure turbine 40 and low-pressure shaft 58 may be referred to as the low-pressure spool assembly 26 or low-pressure spool 26. In some examples, as shown in FIG. 2A, engine 18A may include generator 60, which is operably coupled to one or more of HP shaft 54 or LP shaft 58, e.g., in an embedded (co-axial) with HP shaft 54 and/or LP shaft 58 or non-co-axial.

Engine system 18A may also include a rectifier/inverter 62. In some examples, electrical systems 65 and power storage device 66 may be part of the aircraft system 10. In some examples, aircraft 10 may also include controller 64 (which may represent an example of the FADEC or other engine controller). In some examples, controller 64 may include control circuitry for the control of the engine systems and may control the rectifier 62. In some examples, controller 64 may include one or a combination of controllers as part of a control system that controls the operation of engine 18A and/or other components of aircraft 10. For example, controller 64 may represent more than one controller, wherein the more than one controller includes one or more electronic engine controllers. The electronic engine controllers may be part of the engine but may be physically located on the aircraft. In some examples, one of the individual controllers of controller 64 may control the electrical loads and battery in aircraft 10 as part of aircraft 10. As illustrated, all or a portion of controller 64 may be located on aircraft 10. However, there may be some configuration where an engine controller may be mounted on engine 18A.

In some examples, electrical system 65 and power storage system 66, which are devices that can absorb relatively large amounts of power, use power supplied by generator 60. As described herein, the amount of electrical load applied by electrical system 65 and/or power storage system 66 on generator 60 may be varied to vary the amount of torque load applied by generator 60 on low-pressure shaft 58, e.g., to decrease the rotational speed of low-pressure shaft 58 over a shorter period of time in combination with the reduction in thrust by engine 18A. The generator output voltage may be controlled by rectifier 62 that may control the power input to power storage 66 on a DC bus. If rectifier 62 is powering a DC bus with multiple power sources (not shown) then it may also control the generator power to electrical system 65.

Controller 64 may be configured to control the components of engine 18A and/or aircraft 10 individually and selectively such that engine 18A and aircraft 10 more generally implement the techniques described herein. Controller 64 may comprise any suitable arrangement of hardware, software, firmware, or any combination thereof, to perform the techniques attributed to controller 64 herein. Examples of controller 64 include any of one or more microprocessors, digital signal processors (DSPs), application specific integrated circuits (ASICs), field programmable gate arrays (FPGAs), processing circuitry, or any other equivalent integrated or discrete logic circuitry, as well as any combinations of such components. When controller 64 includes software or firmware, controller 64 further includes any necessary hardware for storing and executing the software or firmware, such as one or more processors or processing units. In some examples, all or portions of controller 64 may be embodied in a full authority digital engine control (FADEC) including an electronic engine controller (EEC) or engine control unit (ECU) and related accessories that control one or more aspects of the operation of engine system 18A.

In general, a processing unit may include one or more microprocessors, DSPs, ASICs, FPGAs, or any other equivalent integrated or discrete logic circuitry, as well as any combinations of such components. Although not shown in FIG. 2B, controller 64 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 64 (e.g., may be external to a package in which controller 64 is housed).

Although controller 64 is generally described as being the primary unit for controlling each of the engine components of engine system 18A for performing the techniques described herein, in some examples, the individual components of engine system 18A may include additional functionality for performing some or all the operations described below with respect to controller 64. For example, a combination of one or more of HP compressor 32, turbines 38, 40, propulsor 28, low-pressure compressor 29, generator 60, rectifier/inverter 62, and the like may include components for controlling the operation of engine system 18A in the manner described herein.

As described herein, generator 60, is configured to generate power from the rotation of shaft 58, e.g., as driven by turbine 40. The electrical energy generated by generator 60 in a generator mode may be used to provide operational power to one or more electrically operated systems 65 of aircraft 10 (FIG. 1). In some examples, generator 60 may be configured to generate continuous aircraft or transient system power also defined by the desired end user application. Example electrical systems 65 that may be powered by generator 60 include hydraulic and/or pneumatic drive systems, environmental control systems, communications systems, directed energy systems, radar systems and component cooling systems. Electrical systems 65 may be any system having electrical components requiring power to operate. When operation power is supplied by a generator such as generator 60, electrical system 65 may apply an electrical load on the generator in order for electrical system 65 to operate in the desired manner.

Additionally, or alternatively, all or some of the power generated by generator 60 may be stored by power storage device 66. In such an example, rectifier/inverter 62, under the control of controller 64 may increase its output voltage to input all or a portion of the power generated by generator 60 as direct current to power storage device 66 for storage of the power. Power storage device 66 may be any suitable device such as one or more suitable batteries or capacitors. Engine 18A may utilize the power stored in power storage device at times when the power generated by generator 60 is relatively low. Power storage device 66 may apply (e.g., selectively) an electrical load on generator 60 to recharge the power storage device (e.g., battery). The electrical load applied by power storage device 66 on generator 60 may increase the torque on LP shaft 58.

In some examples, an engine system may include two generators, one generator operatively coupled to the HP rotor/HP shaft 54 and the other generator to the lower-pressure rotor/shaft 58.

Figure 2B:
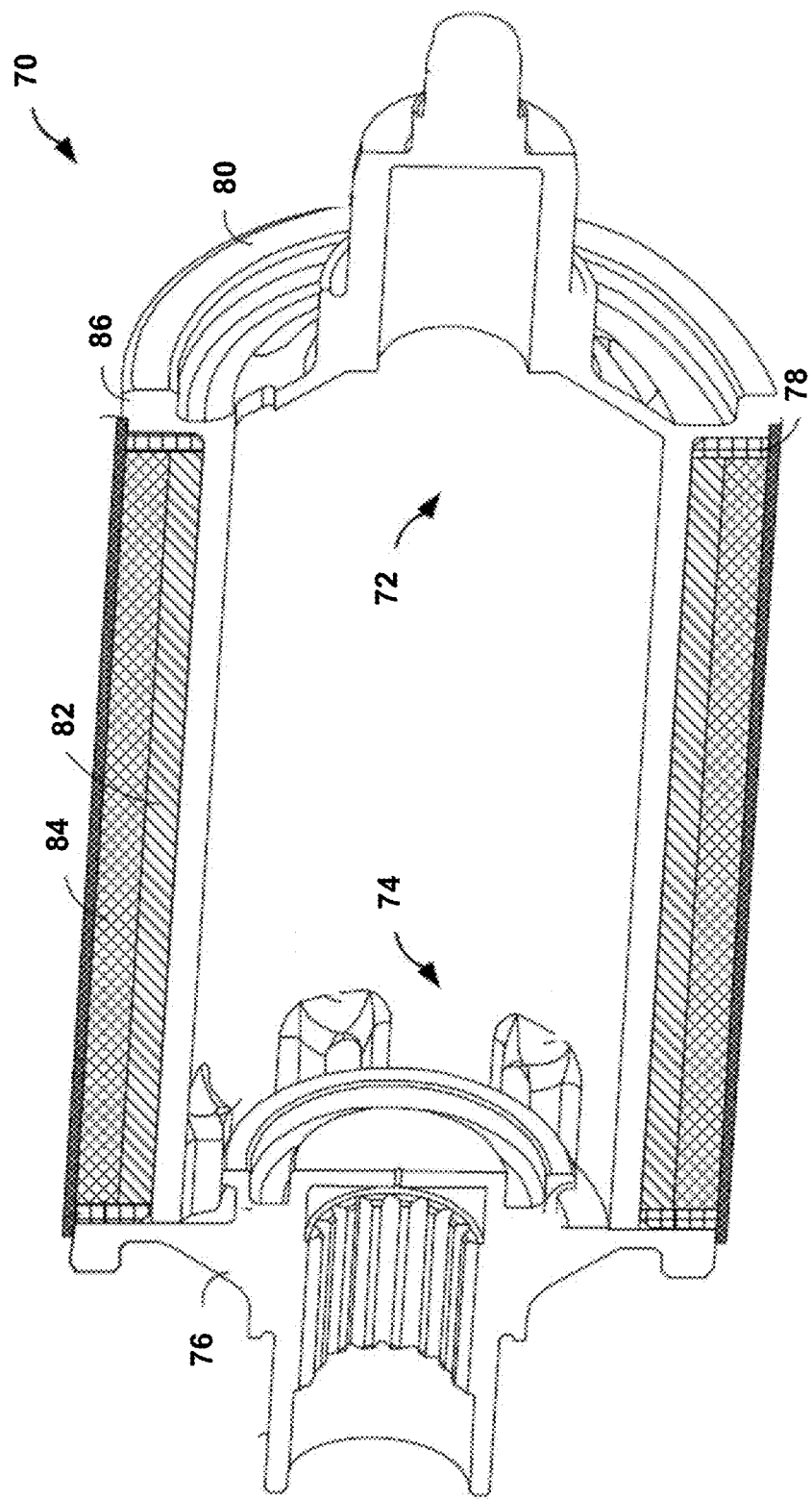
FIG. 2B is a cross-sectional view of a rotor of the electrical machine configured in accordance with one or more aspects of this disclosure.

Electrical systems 65 may represent any system coupled to generator 60 via rectifier 62, such as aircraft anti-ice heating, weapon systems, navigation systems including radar, environmental cooling systems (ECS), gas-turbine engine control systems (which may include controller 64), gas-turbine ignition systems, etc. In the example of FIG. 2B, electrical systems 65 is assumed to represent a gas-turbine ignition system that includes an ignitor that facilitates combustion in a HP stage of gas turbine engine 18A. As such, electrical systems 65 may be referred to as ignition system 65 or ignitor 65.

One type of generator suitable for aircraft is referred to as a permanent magnet generator. A permanent magnet generator includes a rotor having affixed thereon permanent magnets, which are commonly formed from rare earth metals that produce large magnetic fields relative to the size of the permanent magnets. These high magnetic fields may induce a large current in windings around stators of the permanent magnetic generator, and thereby generate high (or in other words, large) voltages. As such, permanent magnet generators are relatively small and light, but may produce high voltages similar to much larger and heavier generators, such as induction generators. Given the size and weight, permanent magnet generators may reduce flight weight of aircraft 10 while providing sufficient power to the electrical systems.

However, for permanent magnet generators, voltage is generated as a function of revolutions per minute for the rotor, providing more voltage when the rotor rotates faster. Higher voltages may produce more heat, which in certain contexts may require the addition of a cooling system, which adds weight and additional maintenance to the electrical system. Further, when the generator fails (e.g., short circuits) or there is an issue with an electrical system powered by the generator, there needs to be a mechanism (e.g., a clutch) to disengage the generator from the driving torque (e.g., a spool of a gas turbine engine via the accessory gearbox), which adds additional complexities electrical system 65 in terms of adding weight and additional maintenance.

In accordance with various aspects of the techniques described in this disclosure, a permanent magnet generator 60 may include an active rotor segment that facilitates more consistent voltage generation within defined ranges. This generator 60 (which may refer to a starter motor/generator, a starter motor, and/or a generator—or any other electrical machine) may include second permanent magnets affixed to the active rotor segment in alternative polarities as well as first permanent magnets affixed to a fixed rotor segment in alternative polarities. Via an actuator mechanism (not shown in the example of FIG. 1), generator 60 may displace (e.g., rotate) the active motor segment relative to the fixed rotor segment, which may alter the phase of the second permanent magnets relative to the first permanent magnets in order to change a first voltage generated by the generator to a second different voltage.

By displacing the active rotor segment relative to the fixed rotor segment, generator 60 may reduce or increase induction by the first and second permanent magnets during operation of generator 60. For example, displacing the active rotor segment such that the alternating polarities of the first and second permanent magnets more closely align (meaning a north/south polarity of the first permanent magnets are more closely adjacent to a north/south polarity of the second permanent magnets) may result in increased induction and therefore higher voltage generation. Likewise, displacing the active rotor segment such that the alternating polarities of the first and second permanent magnets are more closely unaligned (meaning a north/south polarity of the first permanent magnets are more closely adjacent to a south/north polarity of the second permanent magnets) may result in decreased induction and less voltage generation.

In operation, generator 60 may include a drive shaft, where the fixed rotor segment couples to the drive shaft and the active rotor segment couples to the drive shaft axially adjacent to the fixed rotor segment along the drive shaft. The fixed active rotor segment has affixed thereon first permanent magnets in alternating polarity, and the active rotor segment has affixed thereon second permanent magnets of alternating polarity. The permanent magnets of the first permanent magnets and the second permanent magnets may be arranged according to a Halbach array.

The fixed rotor segment may be fixed to the drive shaft while the active rotor segment may be coupled to an actuator mechanism, such that the active rotor segment may be displaced (e.g., rotated) relative to the fixed rotor segment, which may adapt an alignment (or in other words, phase) of the first permanent magnets relative to the second permanent magnets. In other words, the actuator mechanism may be configured to articulate the active rotor segment relative to the fixed rotor segment and thereby alter a phase of the second permanent magnets relative to the first permanent magnets in order to change a first voltage generated by the electrical machine to a second voltage generated by the electrical machine, the second voltage being different than the first voltage.

As described herein, the actuator mechanism may comprise one or more of a torque-based (e.g., centrifugal-based), hydraulic-based, pneumatic-based, and/or other types of actuator mechanism. Given that permanent magnets may resist alignment (given that polarities of the same type generally resist one another), the actuator mechanism may include a biasing element configured to facilitate alignment of the same polarities of the first and second permanent magnets. The biasing element may comprise a spring that resists unalignment of the polarities of the first and second permanent magnets or some other resistive element driving by hydraulics, pneumatics, or some other resistive biasing elements. In some instances, realignment of the active and fixed rotor segments may include energizing one or more stators to assist in realignment.

As noted above, using an actuator mechanism to displace the active rotor segments may reduce the need for intermediate control mechanisms (such as a clutch) to disengage the drive shaft of generator 60 from the LP spool, given that the actuator mechanism may effectively reduce, if not eliminate, voltage generation through displacement of the active rotor segment. As such, the drive shaft of generator 60 may directly couple to an accessory gearbox for gas turbine engine 18A without an intervening clutch (or other intermediate control mechanism) capable of disengaging the drive shaft from the accessory gearbox. In this example, the actuator mechanism may displace the active rotor spool relative to the fixed rotor spool in order to generate an insubstantial voltage (e.g., approximately 0 volts), which is different from the operating voltage (e.g., around 500 volts or 1000 volts or some voltage between 500 volts and 1000 volts) normally generated by generator 60.

In this respect, various aspects of the techniques may provide one or more technical improvements that realize one or more practical applications. The actuation mechanism may displace the active rotor segment in a manner that allows for more consistent voltage generation (e.g., between 500 volts and 1000 volts). The addition of the active rotor segments within generator 60 may, via the actuator mechanism, allow generator 60 to more consistently generate voltages within a range, as well as disable voltage generation to accommodate failures or other issues in the electrical system without requiring additional cooling systems and/or a clutch to disengage the generator from the LP spool. As such, generator 60 having active rotor segments may provide the benefits of permanent magnet generators without introducing high voltages that may require larger and more tolerant safety measures in terms of fuses, switches, and other electrical components, as well as avoiding the need for cooling systems to counteract the increased heat and/or a clutch to disengage generator 60 from the driving torque (e.g., provided by the LP spool) in failure events.

FIG. 2B is a cross-sectional view of a rotor of the electrical machine configured in accordance with one or more aspects of this disclosure. As shown in the example of FIG. 2B, rotor 70 may represent an example of a rotor from generator 60 shown in FIG. 2A.

Rotor 70 includes a first end 72 and a second end 74 of cylinder body, which may include a pilot configured to receive at least a portion of end flange 76. Rotor 70 may include spacers 78, which may magnetically isolate the flux from the shaft (e.g., spacers 78 may act like air). By including spacers 78, main rotor body 80 may be formed of a material (e.g., magnetic steel) that provides desirable mechanical properties in terms of strength and wear resistance. Spacers 78 may be formed of stainless steel. As shown in the example of FIG. 2B, spacers 78 may be disposed between laminations 82/magnetic material 84 (collectively referred to as laminations) and the retention flange such that the laminations do not directly contact retention flange 86, and spacer 78 disposed between the laminations and end flange 76 such that the laminations do not directly contact end flange 76.

FIGS. 3A-3D are conceptual diagrams illustrating example displacement of an active rotor segment of the generator shown in the examples of FIGS. 2A and 2B in accordance with various aspects of the techniques described in this disclosure. Referring first to the example of FIG. 3A, an example rotor 100 of generator 60 is shown, where rotor 100 includes a fixed rotor segment 102 coupled to a drive shaft (not shown in the examples of FIG. 3A-3D for ease of illustration purposes) and an active rotor segment 104 coupled to the drive shaft adjacent to fixed rotor segment 102.

Fixed rotor segment 102 includes permanent magnets affixed thereon in alternating polarities of south (shown in crosshatch squares) and north (shown as black squares) or combinations thereof (partial crosshatch and partial black squares). The pattern of alternating polarities may conform to any pattern capable of inducing an alternating current (AC) voltage. An example pattern may include a Halbach array. Likewise, active rotor segment 104 includes permanent magnets affixed thereon in alternating polarities of south and north or combination thereof, which again may conform to any pattern, such as the Halbach array.

Figure 3A:
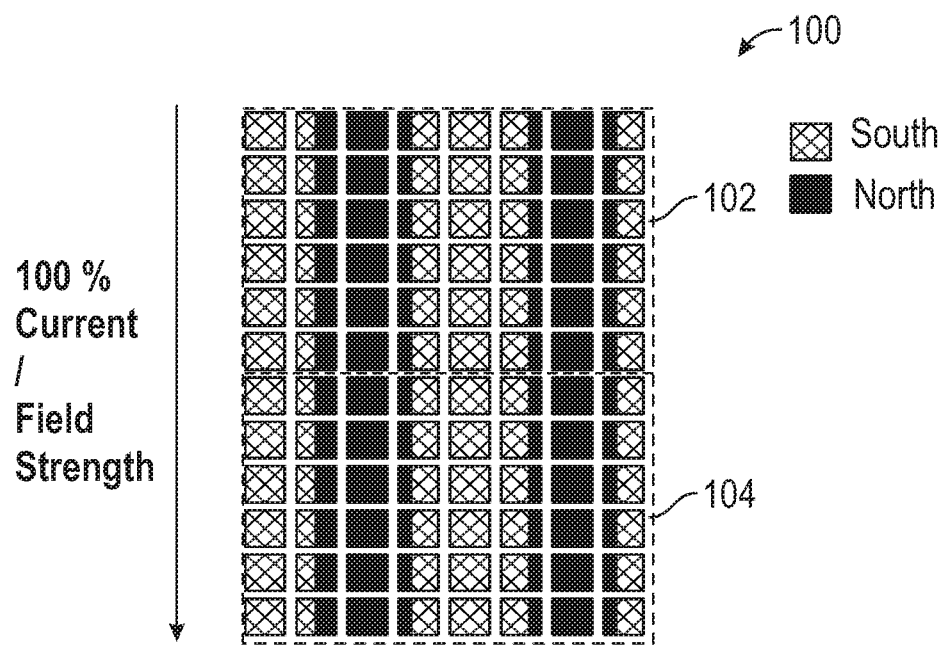
FIGS. 3A-3D are conceptual diagrams illustrating example displacement of an active rotor segment of the generator shown in the examples of FIGS. 2A and 2B in accordance with various aspects of the techniques described in this disclosure.

When the actuator mechanism displaces active rotor segment 104 to be aligned with fixed rotor segment 104 in the manner shown in the example of FIG. 3A, rotor 100 may produce 100% of the possible current/field strength. As noted above, aligning the polarities of the permanent magnets affixed to fixed rotor segment 102 and the polarities of the permanent magnets affixed to active rotor segment 104 may require some assistance, e.g., in the form of a biasing element, to overcome the magnetic repulsion of same polarities of the permanent magnets being forced to align.

Figure 3B:
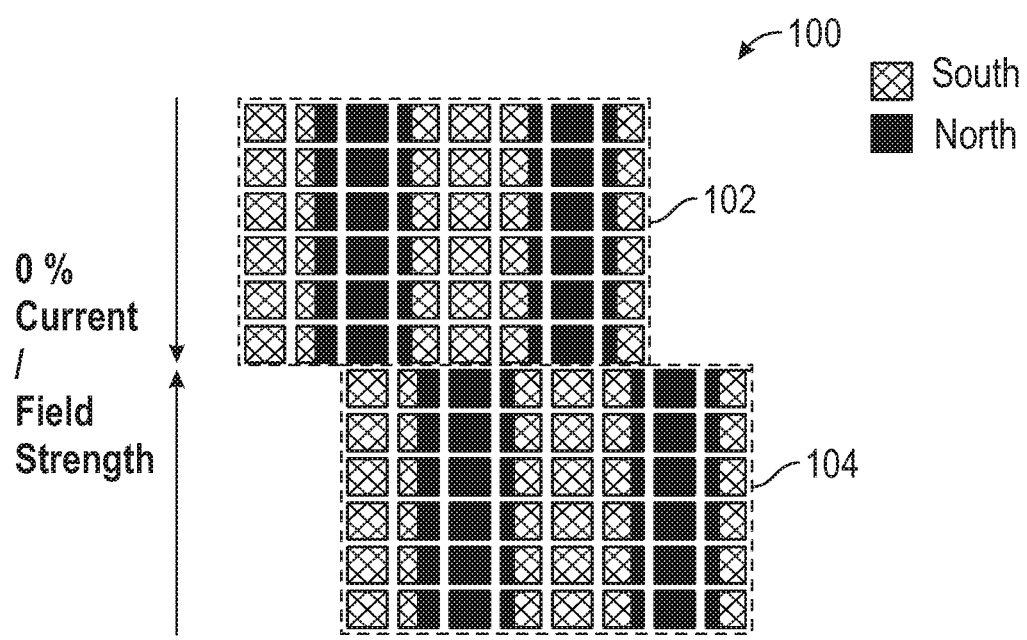

Referring next to the example of FIG. 3B, the actuator mechanism has displaced active rotor segment 104 of rotor 100 such that the permanent magnets of fixed rotor segment 102 are out of phase relative to the permanent magnets of active rotor segment 104. While appearing in the example of FIG. 3B as being physically moved to the right side, active rotor segment 104 may be displaced via rotation and FIG. 3B is illustrating such rotation that results in north and south permanent magnets of fixed rotor segment 102 being 180 degrees out of phase with the north and south permanent magnets of active rotor segment 104. In this state, the permanent magnets of fixed rotor segment 102 induce a current that is effectively cancelled by the current induced by the permanent magnets of active rotor segment 104, providing a nearly insubstantial AC voltage (e.g., 0% current/field strength). In this respect, the actuator mechanism may effectively disable AC voltage generation by generator 60.

Figure 3C:
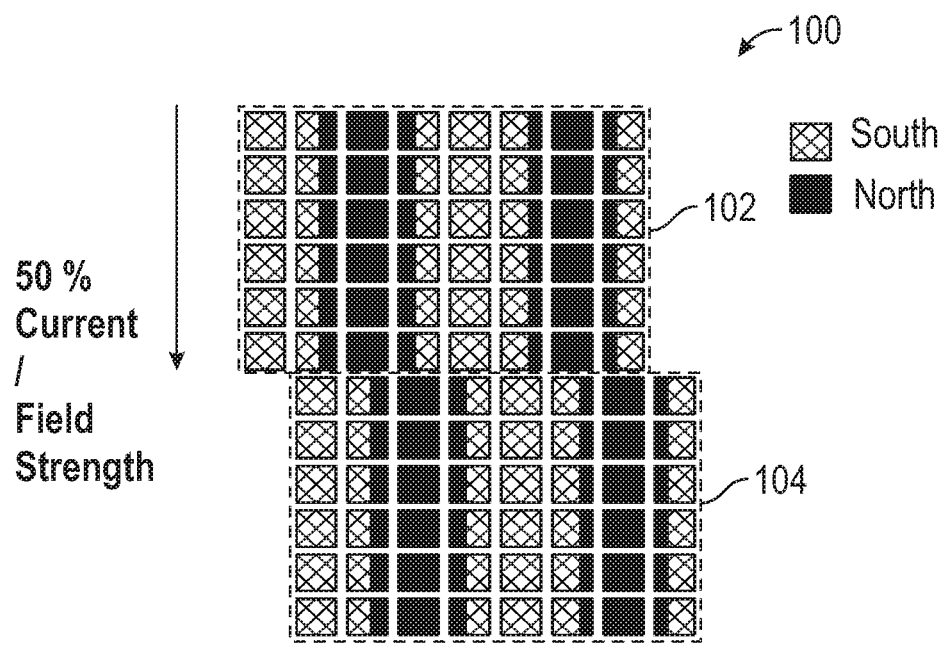

In the example of FIG. 3C, the actuator mechanism has displaced active rotor segment 104 of rotor 100 such that the permanent magnets of fixed rotor segment 102 are out of phase relative to the permanent magnets of active rotor segment 104, but the phase has been decreased from 180 degrees to 90 degrees. Again, while appearing in the example of FIG. 3C as being physically moved to the right side, active rotor segment 104 may be displaced via rotation and FIG. 3C is illustrating such rotation that results in north and south permanent magnets of fixed rotor segment 102 being 90 degrees out of phase with the north and south permanent magnets of active rotor segment 104. In this state, the permanent magnets of fixed rotor segment 102 induce a current that is effectively cancelled by the current induced by the permanent magnets of active rotor segment 104, providing approximately 50% of the current/field strength.

Figure 3D:
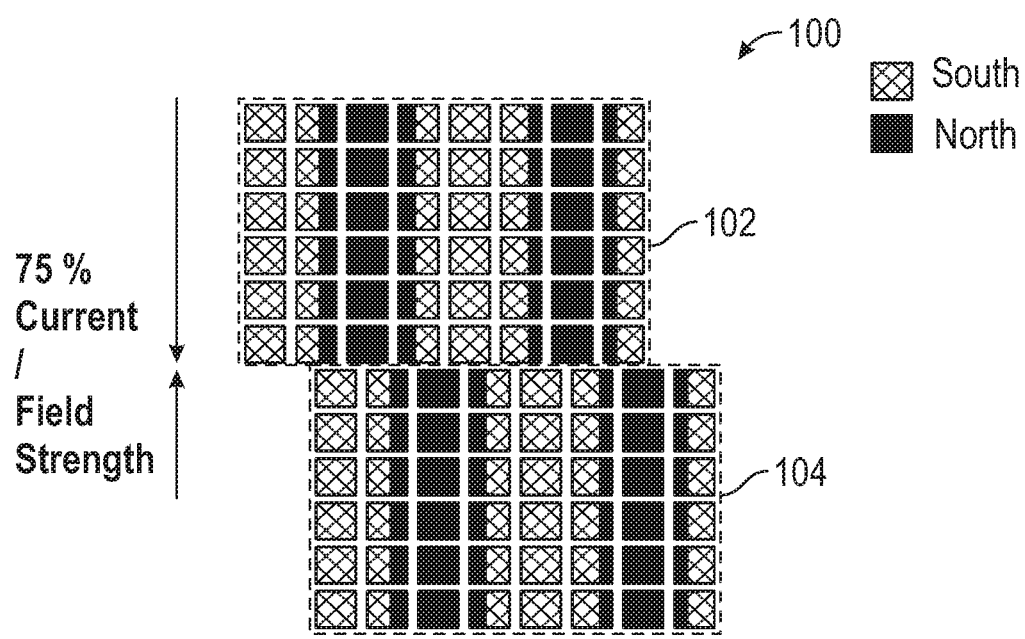

As shown in the example of FIG. 3D, the actuator mechanism has displaced active rotor segment 104 of rotor 100 such that the permanent magnets of fixed rotor segment 102 are out of phase relative to the permanent magnets of active rotor segment 104, but the phase has been decreased from 180 degrees to 135 degrees. Again, while appearing in the example of FIG. 3D as being physically moved to the right side, active rotor segment 104 may be displaced via rotation and FIG. 3D is illustrating such rotation that results in north and south permanent magnets of fixed rotor segment 102 being 135 degrees out of phase with the north and south permanent magnets of active rotor segment 104. In this state, the permanent magnets of fixed rotor segment 102 induce a current that is effectively cancelled by the current induced by the permanent magnets of active rotor segment 104, providing approximately 75% of the current/field strength.

Figure 4A:
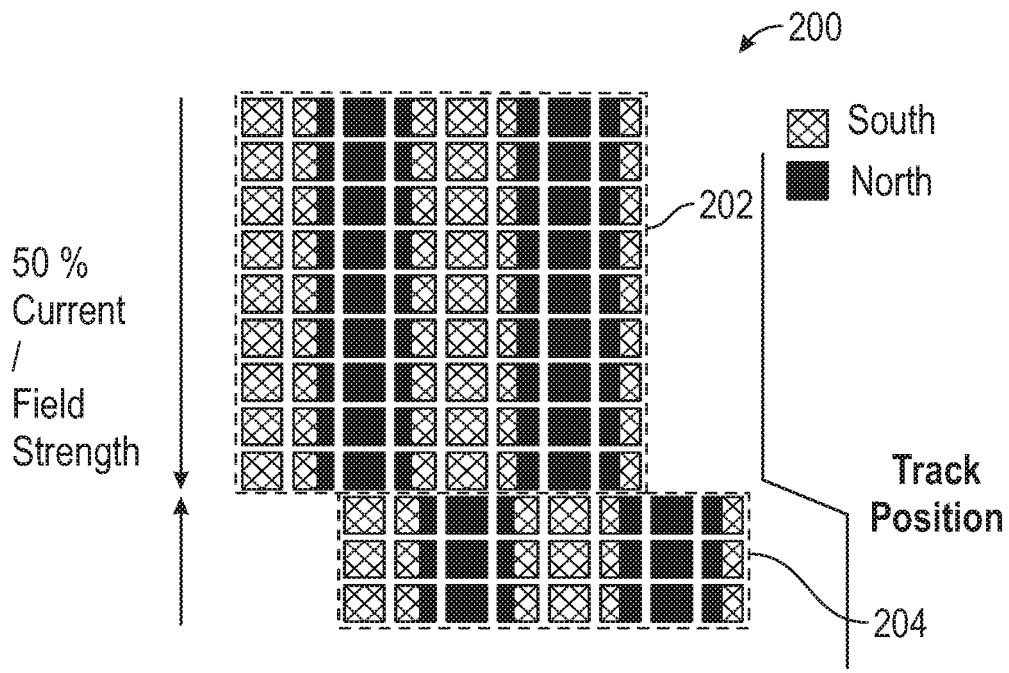
FIGS. 4A and 4B are conceptual diagrams illustrating another example displacement of an active rotor segment of the generator shown in the examples of FIGS. 2A and 2B in accordance with various aspects of the techniques described in this disclosure.
Figure 4B:
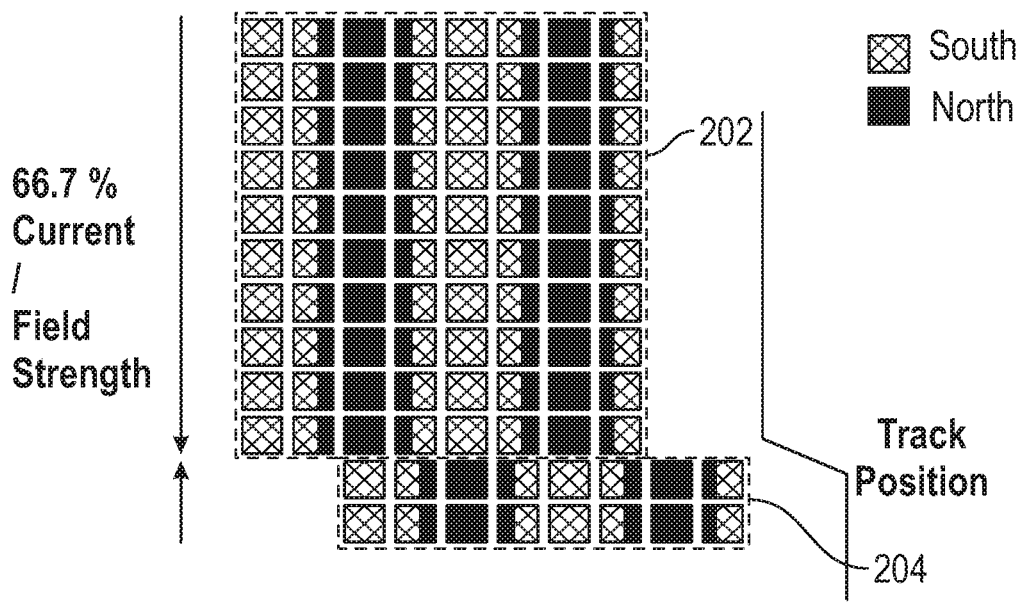

FIGS. 4A and 4B are conceptual diagrams illustrating another example displacement of an active rotor segment of the generator shown in the examples of FIGS. 2A and 2B in accordance with various aspects of the techniques described in this disclosure. In the example of FIG. 4A, a rotor 200 of generator 60 is shown, which is similar to rotor 100 described above with respect to the examples of FIGS. 3A-3D except that an active rotor segment 204 of rotor 200 is actuated using a track that is either fixed or movable along the axial length of rotor 200.

When used as a starter motor (operating at low RPMs in either a counter-clockwise or clockwise direction in order to facilitate starting of a gas turbine engine or other engine type), the track may force alignment of the permanent magnet polarities. However, when operating as a generator (in instances where the generator is a hybrid starter motor/generator) in the opposite direction (and at greater RPMs), the track may utilize centrifugal forces to displace active rotor segment 204 relative to fixed rotor segment 202 of rotor 200 (which is fixed by way of the track). In this instance, the torque-based activation mechanism may rely on centrifugal forces to displace active rotor segment 204 to limit current and/or field strength by 50%.

In the example of FIG. 4B, the track position has changed to only allow two rows of permanent magnets affixed to active rotor segment 204 to be displaced. In other words, the track may move down by one segment and one more of the active segments is aligned with the fixed segments at the top of fixed rotor segment 202 in FIG. 4B relative to the example of FIG. 4A. As such, 50% of the rows are fixed and the other 50% are each active segments riding the track which has a slanted section sized such that only one row is on the slant at a time so the other rows can provide full torque.

The torque actuator mechanism may thereby control AC voltage generation by limiting, in this instance, current and/or field strength to 66.7%. In this respect, the torque actuator mechanism is configured to allow generator 60 to act as a starter motor during a start phase for a gas turbine engine, generate the first voltage during low RPM operation of the gas turbine engine, and the second different voltage during high RPM operation of the gas turbine engine. In some instances, the first voltage and the second voltage may both reside within a voltage range, e.g., the first voltage is within +/−10% despite changes in RPMs from relatively low RPMs to relatively high RPMs. Providing a consistent voltage using permanent magnet generator 60 may allow for reduced weight (as higher voltages may require heavier electrical equipment—fused, switches, etc.), reduce cost (as such heavier electrical equipment may cost more), and the like.

Figure 5A:
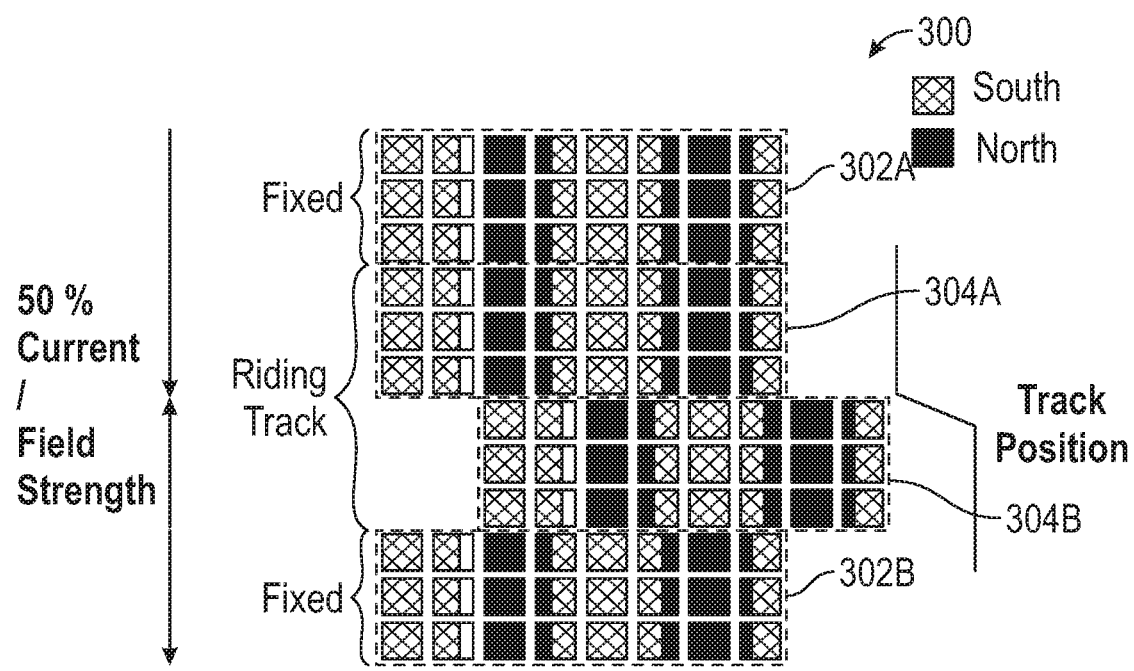
FIGS. 5A and 5B are conceptual diagrams illustrating yet another example displacement of an active rotor segment of the generator shown in the examples of FIGS. 2A and 2B in accordance with various aspects of the techniques described in this disclosure.
Figure 5B:
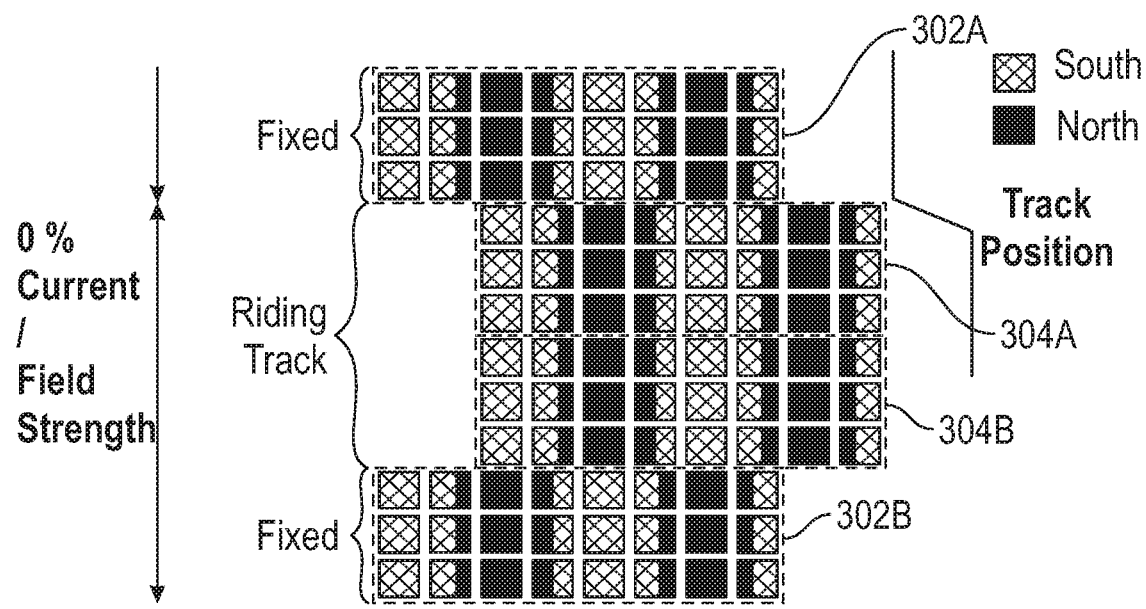

FIGS. 5A and 5B are conceptual diagrams illustrating yet another example displacement of an active rotor segment of the generator shown in the examples of FIGS. 2A and 2B in accordance with various aspects of the techniques described in this disclosure. In the example of FIG. 5A, a rotor 300 is shown that is similar to rotor 200, except that rotor 300 includes two different fixed rotor segments 302A and 302B as well as two active rotor segments 204A and 204B. Fixed rotor segment 302A is attached to an axial end of the drive shaft, while fixed rotor segment 302B is attached to an opposite axial end of the drive shaft. Attaching fixed rotor segments 302A and 302B in this manner may allow generator 60 to maintain a compact form factor compared to having active rotor segments on either end of the drive shaft given that generator 60 would have to be extended axially to accommodate the track, thereby increasing the weight and size of generator 60 (as the housing may need to be extended to accommodate the track).

In any event, the torque actuator mechanism may drive a helical spline (or any form of linearly actuating joints) to move the track, which may have bevelled edges to accommodate movements that require displacing the active rotor segments 304A and/or 304B back into phase alignment (e.g., 0 degrees) in which the polarity of the permanent magnets affixed to fixed rotor segments 302A/302B in aligned with the polarity of the permanent magnets affixed to the active rotor segments 304A/304B. In the example of FIG. 5A, the torque actuator mechanism may move the track to allow active rotor segment 304B to displace relative to active rotor segment 304A (which is fixed by way of the track) and fixed rotor segment 302B, which may reduce current/field strength by approximately 50%.

In the example of FIG. 5B, the torque actuator mechanism may move the track position such that both active rotor segments 304A and 304B are displaced relative to fixed rotor segments 302A and 302B, thereby effectively disabling AC voltage production by generator 60. In this respect, the permanent magnets affixed to active rotor segments 304A and 304B are aligned and counteract current and field strength produced by the permanent magnets affixed to fixed rotor segments 302A and 302B, thereby reducing current and/or field strength to approximately 0%. In this respect, generator 60 may disable voltage generation when failures occur either internally within generator 60 or externally in electrical systems 65.

Figure 6:
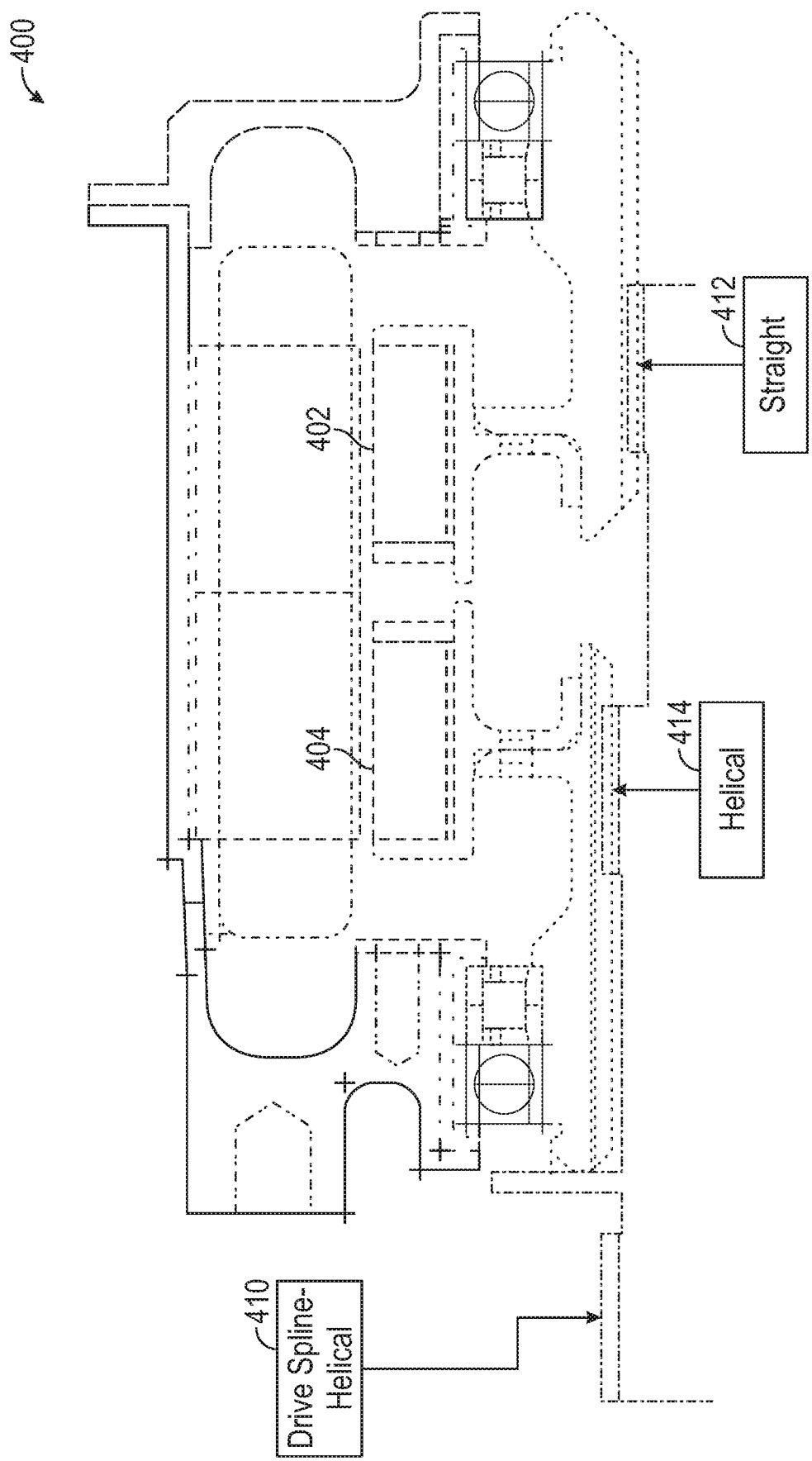
FIG. 6 is a schematic diagram illustrating an axisymmetric view of an example generator including an actuator mechanism for controlling displacement of an active rotor segment of the generator shown in the example of FIGS. 2A and 2B according to various aspects of the techniques described in this disclosure.

FIG. 6 is a schematic diagram illustrating an axisymmetric view of an example generator including an actuator mechanism for controlling displacement of an active rotor segment of the generator shown in the example of FIGS. 2A and 2B according to various aspects of the techniques described in this disclosure. In the axisymmetric view shown in FIG. 6, a generator 400 is shown that represents another example of generator 60. Generator 400 includes fixed rotor segment 402 and active rotor segment 404.

Fixed rotor segment 402 may represent another example of fixed rotor segments 102, 202, and/or 302A/302B. Active rotor segment 404 may represent another example of active rotor segments 104, 204, and/or 304A/304B. While shown with a single fixed rotor segment 402 and a single active rotor segment 404, generator 400 may include any number of fixed rotor segments and active rotor segments (e.g., two or more fixed rotor segments 302A and 302B and two or more active rotor segments 304A and 304B as shown in the examples of FIGS. 5A and 5B).

Generator 400 may couple to a helical drive shaft 410, which may drive a straight spline 412 and a helical spine 414. Straight spline 412 may mechanically couple to fixed rotor segment 402, which rotates fixed rotor segment 402 in a fixed (non-variable) manner, meaning that as helical drive spline 410 rotates at a given RPM, the straight spline 412 rotates at the same or nearly the same given RPM. Helical spline 414 may couple to helical drive shaft 410 (either a uniform pitch helical spline or a varying pitch helical spine) to rotate active rotor segment 404 to control voltage output based on a given torque applied by the helical drive shaft 410. Helical spline 414 may utilize torque applied by helical drive shaft 410 to reduce voltage output the faster helical drive shaft 410 spins (or, in other words, rotates, where the reduction in voltage may occur due to varying pitches along helical spline 414) to allow one or more of active rotor segments 404 to be displaced relative to fixed rotor segment 402.

In this respect, helical drive shaft 410 and helical spline 414 may represent a torque actuator mechanism that is configured (mechanically configured via the bevelled edge of the track) to displace active rotor segment 404 based on torque applied to helical drive shaft 410. The torque applied to helical drive shaft 410 may drive helical spline 414 to move the track (which, as a result, may be referred to as an "active track") within generator 400. The result of moving active track may cause active rotor segment 404 to rotate relative to fixed rotor segment 402 and thereby alter the phase of the permanent magnets affixed to active rotor segment 404 relative to the permanent magnets affixed to fixed rotor segment 402. However, because there is no active track for fixed rotor segment 402, the torque applied to helical drive shaft 410 only drives straight spline 412 in a fixed manner.

Figure 7B:
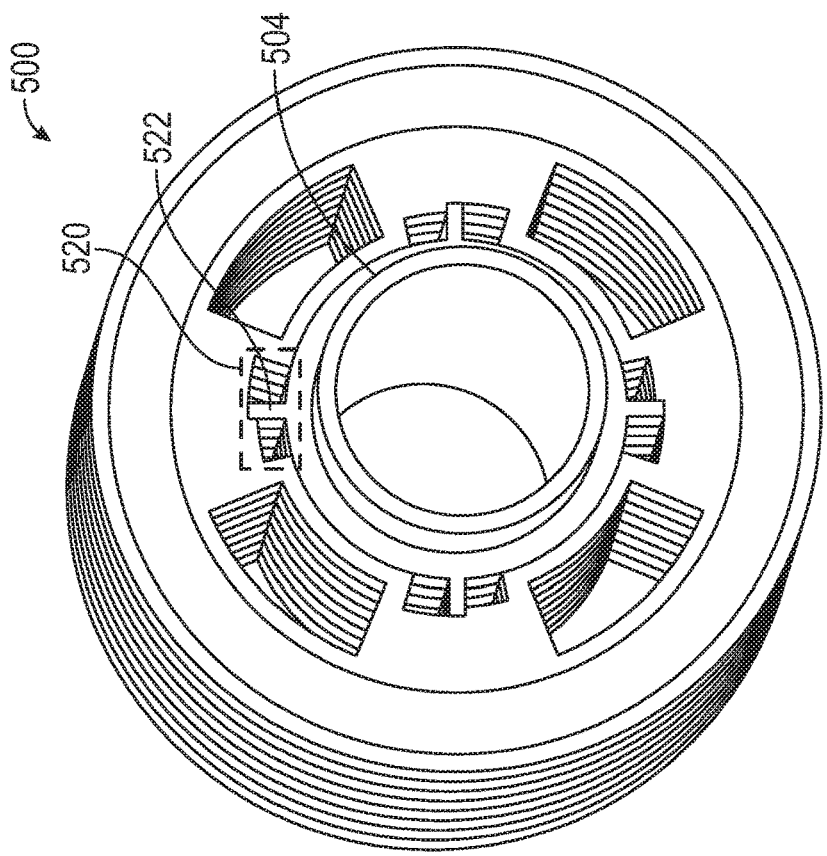
FIGS. 7A and 7B are diagrams illustrating example torque-based displacement of an active rotor segment within the generator shown in the examples of FIGS. 2A and 2B according to various aspects of the techniques described in this disclosure.
Figure 7A:
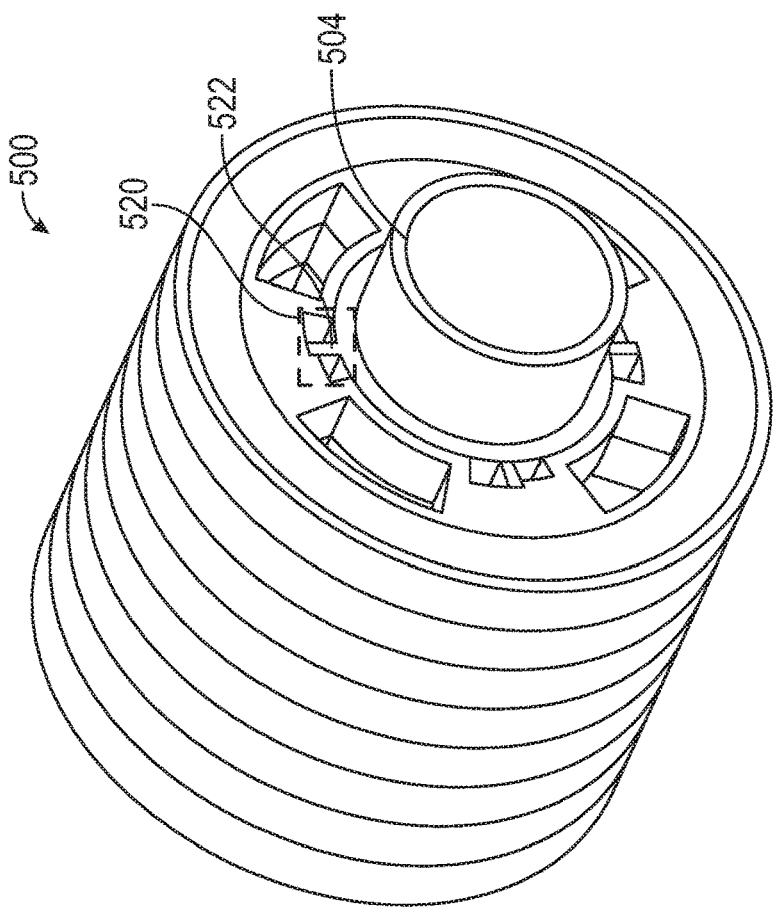

FIGS. 7A and 7B are diagrams illustrating example torque-based displacement of an active rotor segment within the generator shown in the examples of FIGS. 2A and 2B according to various aspects of the techniques described in this disclosure. As shown in FIGS. 7A and 7B, a generator 500 may represent an example of generator 60 described above with respect to FIGS. 1-6. Generator 500 includes an active rotor segment 504 that includes a torque control element (e.g., a tab) 522 that interacts with active track 520.

Applying torque in a counter-clockwise direction via the drive shaft may cause active rotor segment 504 to rotate in a counter-clockwise manner which causes tab 522 to interface with a left-hand side of track 520 and thereby rotate active rotor segment 504 (e.g., in line with rotation of fixed rotor segments, which are not shown, meaning that the polarities of the magnets for both active rotor segment 504 and fixed rotor segments are aligned). However, applying torque to active rotor segment 504 in a clockwise manner may cause active rotor segment 504 to rotate without rotate freely before contacting the right-hand side of track 520 (which may displace the permanent magnets affixed to active rotor segment 504, while fixed rotor segments may rotate the permanent magnets affixed to fixed rotor segments, thereby altering a phase of the permanent magnets affixed to active rotor segment 504 and the permanent magnets affixed to the fixed rotor segments.

In this respect, active track 520 along with tab 522 may represent a torque actuator mechanism that is configured to displace active rotor segment 504 based on torque applied to the drive shaft. While described with respect to torque actuator mechanism, various other actuator mechanisms may be used. For example, a hydraulic mechanism that uses hydraulic pressure from a gas turbine engine to articulate active rotor segment 504 relative to the fixed rotor segments. In some examples, the actuator mechanism may include an internal pre-loading spring mechanism to articulate active rotor segment 504 relative to the fixed rotor segment. The actuator mechanism, as another example, may include a pneumatic actuator mechanism that relies on air pressure to articulate active rotor segment 504 relative to the fixed rotor segment.

As noted above, the track may slide to control displacement of active rotor segment 504 relative to fixed rotor segments (which are not shown). Generator 60 may slide this track using a bearing to a stationary shaft inside/coaxial to the motor shaft, which can then be leadscrew or hydraulically actuated, and thereby allow control at arbitrary speeds. A hydraulic pressure based system can automatically reduce the back EMF as a function of a hydraulic system's performance-which can be an analog for speed depending on the pump used in the system.

Figure 8:
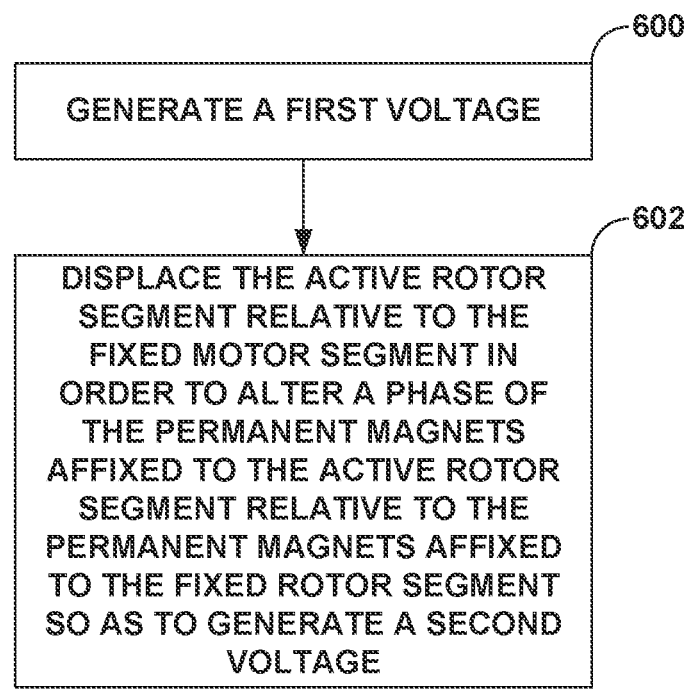
FIG. 8 is a flowchart illustrating example operation of the generator shown in the example in FIGS. 2A and 2B to displace an active rotor segment in accordance with various aspects of the techniques described in this disclosure.

FIG. 8 is a flowchart illustrating example operation of the generator shown in the example in FIGS. 2A and 2B to displace an active rotor segment in accordance with various aspects of the techniques described in this disclosure. As described above, generator 60 may include a drive shaft, where the fixed rotor segment couples to the drive shaft and the active rotor segment couples to the drive shaft axially adjacent to the fixed rotor segment along the drive shaft. The fixed active rotor segment has affixed thereon first permanent magnets in alternating polarity, and the active rotor segment has affixed thereon second permanent magnets of alternating polarity. The permanent magnets of the first permanent magnets and the second permanent magnets may be arranged according to a Halbach array.

The fixed rotor segment may be fixed to the drive shaft while the active rotor segment may be coupled to an actuator mechanism, such that the active rotor segment may be displaced (e.g., rotated) relative to the fixed rotor segment, which may adapt an alignment (or in other words, phase) of the first permanent magnets relative to the second permanent magnets. In other words, the actuator mechanism may be configured to articulate the active rotor segment relative to the fixed rotor segment and thereby alter a phase of the second permanent magnets relative to the first permanent magnets in order to change a first voltage generated by the electrical machine to a second voltage generated by the electrical machine, the second voltage being different than the first voltage.

Generator 60 may generate the first voltage (600) via application of torque to the drive shaft, which rotates the rotors having permanent magnets affixed thereon to induce a current in windings around stators within generator 60. Generator 60 may include the above noted actuator mechanism that may displace the active rotor segment relative to the fixed motor segment in order to alter a phase of the permanent magnets affixed to the active rotor segment relative to the permanent magnets affixed to the fixed rotor segment so as to generate a second voltage (602).

The following examples may illustrate one or more aspects of the disclosure:

Example 1. An electrical machine comprising: a drive shaft; a fixed rotor segment coupled to the drive shaft, the fixed rotor segment having affixed thereon first permanent magnets of alternating polarity; an active rotor segment axially adjacent to the fixed rotor segment along the drive shaft, the active rotor segment having affixed thereon second permanent magnets of alternating polarity; and an actuator mechanism configured to articulate the active rotor segment relative to the fixed rotor segment and thereby alter a phase of the second permanent magnets relative to the first permanent magnets in order to change a first voltage generated by the electrical machine to a second voltage generated by the electrical machine.

Example 2. The electrical machine of example 1, wherein the actuator mechanism comprises a torque actuator mechanism that is configured to displace the active rotor segment based on torque applied to the drive shaft.

Example 3. The electrical machine of example 2, wherein the torque applied to the drive shaft drives a helical spine that rotates an active track within the electrical machine causing the active rotor segment to rotate relative to the fixed rotor segment and thereby alter the phase of the second permanent magnets relative to the first permanent magnets.

Example 4. The electrical machine of example 3, wherein the torque applied to the drive shaft drives a straight spline coupled to the fixed rotor segment.

Example 5. The electrical machine of example 2, wherein the torque actuator mechanism is configured to allow the electrical machine to: act as a starter motor during a start phase for a gas turbine engine; and generate the first voltage during low revolution per minute operation of the gas turbine engine; and generate the second voltage during high revolution per minute operation of the gas turbine engine, the high revolution per minute operation exceeding the low revolution per minute operation.

Example 6. The electrical machine of any combination of examples 1-5, wherein the actuator mechanism comprises a hydraulic actuator mechanism that uses hydraulic pressure from an engine to articulate the active rotor segment relative to the fixed rotor segment.

Example 7. The electrical machine of any combination of examples 1-6, wherein the actuator mechanism comprises an internal spring mechanism to articulate the active rotor segment relative to the fixed rotor segment.

Example 8. The electrical machine of any combination of examples 1-7, further comprising a biasing element configured to facilitate alignment of same polarities of the first permanent magnets and the second permanent magnets.

Example 9. The electrical machine of any combination of examples 1-8, wherein the drive shaft directly couples to an accessory gearbox of a gas turbine engine without an intervening clutch capable of disengaging the drive shaft from the accessory gearbox.

Example 10. The electrical machine of any combination of examples 1-9, wherein the first voltage comprises an operating voltage, and wherein the second voltage comprises an insubstantial voltage.

Example 11. A method comprising: generating, by an electrical machine comprising a fixed rotor segment axially adjacent to an active rotor segment along a drive shaft, a first voltage; and displacing the active rotor segment relative to the fixed rotor segment of the electrical machine in order to alter a phase of second permanent magnets affixed to the active rotor segment relative to first permanent magnets affixed to the fixed rotor segment so as to generate a second voltage.

Example 12. The method of example 11, wherein the actuator mechanism comprises a torque actuator mechanism that is configured to displace the active rotor segment based on torque applied to the drive shaft.

Example 13. The method of example 12, wherein the torque applied to the drive shaft drives a helical spine that rotates an active track within the electrical machine causing the active rotor segment to rotate relative to the fixed rotor segment and thereby alter the phase of the second permanent magnets relative to the first permanent magnets.

Example 14. The method of example 13, wherein the torque applied to the drive shaft drives a straight spline coupled to the fixed rotor segment.

Example 15. The method of example 12, wherein the torque actuator mechanism is configured to allow the electrical machine to: act as a starter motor during a start phase for a gas turbine engine; and generate the first voltage during low revolution per minute operation of the gas turbine engine; and generate the second voltage during high revolution per minute operation of the gas turbine engine, the high revolution per minute operation exceeding the low revolution per minute operation.

Example 16. The method of any combination of examples 11-15, wherein the actuator mechanism comprises a hydraulic actuator mechanism that uses hydraulic pressure from an engine to articulate the active rotor segment relative to the fixed rotor segment.

Example 17. The method of any combination of examples 11-16, wherein the actuator mechanism comprises an internal spring mechanism to articulate the active rotor segment relative to the fixed rotor segment.

Example 18. The method of any combination of examples 11-17, wherein the actuator mechanism includes a biasing element configured to facilitate alignment of same polarities of the first permanent magnets and the second permanent magnets.

Example 19. The method of any combination of examples 11-18, wherein the drive shaft directly couples to an accessory gearbox of a gas turbine engine without an intervening clutch capable of disengaging the drive shaft from the accessory gearbox.

Example 20. A gas-turbine engine system comprising: a gas turbine engine that includes: a low pressure spool assembly configured to rotate a low pressure shaft; and a high pressure spool assembly mechanically coupled to the low pressure spool assembly; an electrical machine comprising: a drive shaft; a fixed rotor segment coupled to the drive shaft, the fixed rotor segment having affixed thereon first permanent magnets of alternating polarity; an active rotor segment axially adjacent to the fixed rotor segment along the drive shaft, the active rotor segment having affixed thereon second permanent magnets of alternating polarity; and an actuator mechanism configured to displace the active rotor segment relative to the fixed rotor segment and thereby alter a phase of the second permanent magnets relative to the first permanent magnets in order to change a first voltage generated by the electrical machine to a second voltage generated by the electrical machine; and an assembly gearbox configured to mechanically couple the low pressure shaft to the drive shaft.

Various examples have been described. These and other examples are within the scope of the following examples and claims.

What is claimed is:
1. An electrical machine comprising:
a drive shaft;
a fixed rotor segment coupled to the drive shaft, the fixed rotor segment having affixed thereon first permanent magnets of alternating polarity;
an active rotor segment axially adjacent to the fixed rotor segment along the drive shaft, the active rotor segment having affixed thereon second permanent magnets of alternating polarity; and
a torque actuator mechanism configured to;
rotate, responsive to a torque applied to the drive shaft being in a first direction, the active rotor segment into a first position relative to the fixed rotor segment; and
rotate, responsive to the torque applied to the drive shaft being in a second direction that is opposite the first direction, the active rotor segment into a second position relative to the fixed rotor segment.
2. The electrical machine of claim 1, wherein the torque applied to the drive shaft drives a helical spine that rotates an active track within the electrical machine causing the active rotor segment to rotate relative to the fixed rotor segment and thereby alter a phase of the second permanent magnets relative to the first permanent magnets.

3. The electrical machine of claim 2, wherein the torque applied to the drive shaft drives a straight spline coupled to the fixed rotor segment.

4. The electrical machine of claim 1, wherein the torque actuator mechanism further configures the electrical machine to:
- act as a starter motor during a start phase for a gas turbine engine, wherein the torque applied to the drive shaft via the electrical machine while acting as the starter motor is in the first direction; and
- act as a generator during a run phase for the gas turbine engine, wherein the torque applied to the drive shaft via the electrical machine while acting as the generator is in the second direction.

5. The electrical machine of claim 1, wherein the torque actuator mechanism comprises a hydraulic actuator mechanism that uses hydraulic pressure from an engine to rotate the active rotor segment relative to the fixed rotor segment.

6. The electrical machine of claim 1, wherein the torque actuator mechanism comprises an internal spring mechanism to rotate the active rotor segment relative to the fixed rotor segment.

7. The electrical machine of claim 1, wherein the torque actuator mechanism further comprising a biasing element configured to facilitate alignment of same polarities of the first permanent magnets and the second permanent magnets.

8. The electrical machine of claim 1, wherein the drive shaft directly couples to an accessory gearbox of a gas turbine engine without an intervening clutch capable of disengaging the drive shaft from the accessory gearbox.

9. A method comprising:
rotating, by an electrical machine comprising:
- a drive shaft;
- a fixed rotor segment coupled to the drive shaft;
- an active rotor segment axially adjacent to the fixed rotor segment along the drive shaft; and
- a torque actuator mechanism, and responsive to a torque applied to the drive shaft being in a first direction, the active rotor segment into a first position relative to the fixed rotor segment; and
rotating, by the electrical machine and responsive to the torque applied to the drive shaft being in a second direction that is opposite the first direction, the active rotor segment into a second position relative to the fixed rotor segment, wherein:
- the fixed rotor segment comprises first permanent magnets of alternating polarity, and
- the active rotor segment comprises second permanent magnets of alternating polarity.

10. The method of claim 9, wherein the torque applied to the drive shaft drives a helical spine that rotates an active track within the electrical machine causing the active rotor segment to rotate relative to the fixed rotor segment and thereby alter a phase of the second permanent magnets relative to the first permanent magnets.

11. The method of claim 10, wherein the torque applied to the drive shaft drives a straight spline coupled to the fixed rotor segment.

12. The method of claim 9, wherein the torque actuator mechanism configures the electrical machine to:
- act as a starter motor during a start phase for a gas turbine engine, wherein the torque applied to the drive shaft via the electrical machine while acting as the starter motor is in the first direction; and
- act as a generator during a run phase for the gas turbine engine, wherein the torque applied to the drive shaft via the electrical machine while acting as the generator is in the second direction.

13. The method of claim 9, wherein the torque actuator mechanism comprises a hydraulic actuator mechanism that uses hydraulic pressure from an engine to rotate the active rotor segment relative to the fixed rotor segment.

14. The method of claim 9, wherein the torque actuator mechanism comprises an internal spring mechanism to rotate the active rotor segment relative to the fixed rotor segment.

15. The method of claim 9, wherein the torque actuator mechanism includes a biasing element configured to facilitate alignment of same polarities of the first permanent magnets and the second permanent magnets.

16. The method of claim 9, wherein the drive shaft directly couples to an accessory gearbox of a gas turbine engine without an intervening clutch capable of disengaging the drive shaft from the accessory gearbox.

17. A gas-turbine engine system comprising:
a gas turbine engine that includes:
- a lower pressure spool assembly configured to rotate a lower pressure shaft; and
- a higher pressure spool assembly mechanically coupled to the lower pressure spool assembly and comprising a higher pressure shaft;

an electrical machine comprising:
- a drive shaft;
- a fixed rotor segment coupled to the drive shaft, the fixed rotor segment having affixed thereon first permanent magnets of alternating polarity;
- an active rotor segment axially adjacent to the fixed rotor segment along the drive shaft, the active rotor segment having affixed thereon second permanent magnets of alternating polarity; and
- a torque actuator mechanism configured to, based on torque applied to the drive shaft, rotate the active rotor segment relative to the fixed rotor segment to alter a phase of the second permanent magnets relative to the first permanent magnets to change a first voltage generated by the electrical machine to a second voltage generated by the electrical machine; and an assembly gearbox configured to mechanically couple the lower pressure shaft to the drive shaft.

* * * * *